(12) United States Patent
Chaffee

(10) Patent No.: US 8,225,444 B2
(45) Date of Patent: Jul. 24, 2012

(54) INFLATABLE DEVICE FORMING MATTRESSES AND CUSHIONS

(76) Inventor: Robert B. Chaffee, Boston, MA (US)

(*) Notice: Subject to any disclaimer, the term of this patent is extended or adjusted under 35 U.S.C. 154(b) by 537 days.

(21) Appl. No.: 12/349,301

(22) Filed: Jan. 6, 2009

(65) Prior Publication Data

US 2009/0300846 A1    Dec. 10, 2009

Related U.S. Application Data

(60) Division of application No. 10/717,410, filed on Nov. 18, 2003, now Pat. No. 7,475,440, and a continuation-in-part of application No. 10/430,040, filed on May 5, 2003, now Pat. No. 7,644,724, and a continuation-in-part of application No. 10/192,757, filed on Jul. 10, 2002, now Pat. No. 7,328,472.

(60) Provisional application No. 60/427,151, filed on Nov. 18, 2002, provisional application No. 60/427,307, filed on Nov. 18, 2002, provisional application No. 60/377,798, filed on May 3, 2002, provisional application No. 60/304,274, filed on Jul. 10, 2001, provisional application No. 60/374,403, filed on Apr. 22, 2002.

(51) Int. Cl.
*A47C 27/08* (2006.01)

(52) U.S. Cl. .................. 5/713; 5/710; 5/655.3

(58) Field of Classification Search .............. 5/706, 710, 5/713, 655.3

See application file for complete search history.

(56) References Cited

U.S. PATENT DOCUMENTS

| | | |
|---|---|---|
| 625,114 A | 5/1899 | MacSpadden |
| 633,968 A | 9/1899 | Swartzwelder |
| 679,519 A | 7/1901 | Smith |
| 827,823 A | 8/1906 | Starr |
| 847,758 A | 3/1907 | Frye |
| 1,185,684 A | 6/1916 | Kraft et al. |
| 1,263,599 A | 4/1918 | Poole |
| 1,361,453 A | 12/1920 | Frey |
| 2,028,060 A | 1/1936 | Gilbert |
| 2,064,695 A | 12/1936 | Sipe |
| 2,112,641 A | 3/1938 | Wheaton |

(Continued)

FOREIGN PATENT DOCUMENTS

EP    0317021    5/1989

(Continued)

OTHER PUBLICATIONS

International Search Report for PCT International Application No. PCT/US03/37230.

(Continued)

*Primary Examiner* — Michael Trettel
(74) *Attorney, Agent, or Firm* — Lando & Anastasi, LLP

(57) ABSTRACT

The invention relates to an inflatable device comprising an electromechanical device and a self-sealing valve, and in particular, to any inflatable device that includes the assembly. In some embodiments, at least a portion of a fluid controller is coupled to and supported by an inflatable bladder of an inflatable device. The fluid controller may be located in a compartment, and the compartment may be within the profile of the bladder. The inflatable device may be a single bladder mattress or a dual bladder mattress. The inflatable device may include a heater or an articulation device. The inflatable device may be multi-positional device or have a storage compartment. The inflatable device may be configurable using one or more members such as a membrane or fasteners.

23 Claims, 19 Drawing Sheets

U.S. PATENT DOCUMENTS

| | | |
|---|---|---|
| 2,168,774 A | 8/1939 | Hurlburt |
| 2,285,324 A | 6/1942 | Bennett |
| 2,288,889 A | 7/1942 | Costello |
| 2,459,689 A | 1/1949 | Dickey et al. |
| 2,482,198 A | 9/1949 | Melichar |
| 2,595,406 A | 5/1952 | Popovich |
| 2,701,579 A | 2/1955 | Hasselquist |
| 2,767,735 A | 10/1956 | Darling |
| 2,803,527 A | 8/1957 | Lundahl |
| 2,823,668 A | 2/1958 | Van Court et al. |
| 2,949,927 A | 8/1960 | Mackal |
| 2,990,070 A | 6/1961 | Cushman |
| 3,086,698 A | 4/1963 | Goldstein |
| 3,095,901 A | 7/1963 | Larson et al. |
| 3,123,336 A | 3/1964 | Price |
| 3,164,151 A | 1/1965 | Vere Nicoll |
| 3,208,721 A | 9/1965 | McHugh |
| 3,367,819 A | 2/1968 | Schlag |
| 3,403,696 A | 10/1968 | Pynchon |
| 3,424,151 A | 1/1969 | Ericson |
| 3,459,363 A | 8/1969 | Miller |
| 3,462,775 A | 8/1969 | Markwitz et al. |
| 3,505,695 A | 4/1970 | Bishaf et al. |
| 3,511,472 A | 5/1970 | Zimmerman |
| 3,561,435 A | 2/1971 | Nicholson |
| 3,610,235 A | 10/1971 | Vagacs |
| 3,665,958 A | 5/1972 | Dunkelis |
| 3,667,075 A | 6/1972 | Ballard et al. |
| 3,667,625 A | 6/1972 | Lucas |
| 3,719,401 A | 3/1973 | Peruglia |
| 3,762,404 A | 10/1973 | Sakita |
| 3,772,717 A | 11/1973 | Yuen et al. |
| 3,785,395 A | 1/1974 | Andreasson |
| 3,829,918 A | 8/1974 | Stamberger |
| 3,831,628 A | 8/1974 | Kintner |
| 3,898,703 A | 8/1975 | Stamberger |
| 3,899,797 A | 8/1975 | Gunst |
| 3,973,588 A | 8/1976 | Holst |
| 3,983,907 A | 10/1976 | Sorensen |
| 3,995,653 A | 12/1976 | Mackal et al. |
| 4,040,526 A | 8/1977 | Baxter et al. |
| 4,068,334 A | 1/1978 | Randall |
| 4,078,580 A | 3/1978 | Rudle |
| 4,168,063 A | 9/1979 | Rowland |
| 4,175,297 A | 11/1979 | Robbins et al. |
| 4,176,681 A | 12/1979 | Mackal |
| 4,266,298 A | 5/1981 | Graziano |
| 4,273,310 A | 6/1981 | Ginzler |
| 4,300,759 A | 11/1981 | Caplan |
| 4,317,244 A | 3/1982 | Balfour-Richie |
| 4,478,587 A | 10/1984 | Mackal |
| 4,515,872 A | 5/1985 | Okano |
| 4,547,919 A | 10/1985 | Wang |
| 4,559,020 A | 12/1985 | Wang |
| 4,579,141 A | 4/1986 | Arff |
| 4,594,743 A | 6/1986 | Owen et al. |
| 4,639,232 A | 1/1987 | Wang |
| 4,644,597 A | 2/1987 | Walker |
| 4,678,014 A | 7/1987 | Owen et al. |
| 4,712,574 A | 12/1987 | Perrot |
| 4,751,452 A | 6/1988 | Kilmer |
| 4,756,032 A | 7/1988 | Wang |
| 4,766,628 A | 8/1988 | Walker |
| 4,768,247 A | 9/1988 | Beier |
| 4,773,104 A | 9/1988 | Wang |
| 4,862,533 A | 9/1989 | Adams, III |
| 4,870,983 A | 10/1989 | Wang |
| 4,890,344 A | 1/1990 | Walker |
| 4,891,855 A | 1/1990 | Cheng-Chung |
| 4,911,405 A | 3/1990 | Weissgerber et al. |
| 4,948,092 A | 8/1990 | Kasper et al. |
| 4,986,738 A | 1/1991 | Kawasaki et al. |
| 4,990,060 A | 2/1991 | Cheng-Chung |
| 5,037,062 A | 8/1991 | Neuhaus |
| 5,040,555 A | 8/1991 | Wang |
| 5,060,324 A | 10/1991 | Marinberg et al. |
| 5,068,933 A | 12/1991 | Sexton |
| 5,071,378 A | 12/1991 | Wang |
| 5,085,214 A | 2/1992 | Barrett |
| 5,102,365 A | 4/1992 | Wang |
| 5,111,838 A | 5/1992 | Langston |
| D328,324 S | 7/1992 | Wang |
| 5,178,523 A | 1/1993 | Cheng-Chung |
| 5,184,309 A | 2/1993 | Simpson |
| 5,186,667 A | 2/1993 | Wang |
| 5,203,831 A | 4/1993 | Lind et al. |
| D341,983 S | 12/1993 | Wang |
| 5,267,363 A | 12/1993 | Chaffee |
| 5,288,286 A | 2/1994 | Davis |
| 5,307,529 A | 5/1994 | Wang |
| 5,367,726 A | 11/1994 | Chaffee |
| 5,432,916 A | 7/1995 | Hahn et al. |
| 5,450,858 A | 9/1995 | Zablotsky et al. |
| 5,474,361 A | 12/1995 | Hwang et al. |
| 5,494,258 A | 2/1996 | Weissgerber et al. |
| 5,503,618 A | 4/1996 | Rey |
| 5,509,154 A | 4/1996 | Shafer et al. |
| 5,535,849 A | 7/1996 | Few |
| 5,542,136 A | 8/1996 | Tappel |
| 5,581,304 A | 12/1996 | Wang |
| 5,588,811 A * | 12/1996 | Price .............................. 417/350 |
| 5,606,756 A | 3/1997 | Price |
| 5,652,484 A | 7/1997 | Shafer et al. |
| 5,839,139 A | 11/1998 | Fink |
| 5,903,941 A | 5/1999 | Shafer et al. |
| 5,904,172 A | 5/1999 | Gifft et al. |
| 5,941,272 A | 8/1999 | Feldman |
| 5,962,159 A | 10/1999 | Satou et al. |
| 5,970,545 A | 10/1999 | Garman et al. |
| 6,008,598 A | 12/1999 | Luff et al. |
| 6,032,080 A | 2/2000 | Brisbane et al. |
| 6,037,723 A | 3/2000 | Shafer et al. |
| 6,073,289 A | 6/2000 | Bolden et al. |
| 6,085,555 A | 7/2000 | Wu et al. |
| 6,098,000 A | 8/2000 | Long et al. |
| 6,129,524 A | 10/2000 | Woollenweber et al. |
| 6,164,314 A | 12/2000 | Saputo et al. |
| 6,185,770 B1 | 2/2001 | Wang |
| 6,202,672 B1 | 3/2001 | Ellis et al. |
| 6,206,654 B1 | 3/2001 | Cassidy |
| 6,237,621 B1 | 5/2001 | Chaffee |
| 6,237,653 B1 | 5/2001 | Chaffee |
| 6,246,317 B1 | 6/2001 | Pickornik et al. |
| 6,253,401 B1 | 7/2001 | Boyd |
| 6,295,675 B1 | 10/2001 | Ellis et al. |
| 6,302,145 B1 | 10/2001 | Ellis et al. |
| 6,378,152 B1 | 4/2002 | Washburn et al. |
| 6,384,715 B1 | 5/2002 | Potter |
| 6,396,224 B1 | 5/2002 | Luff et al. |
| 6,397,419 B1 | 6/2002 | Mechache |
| 6,418,579 B2 | 7/2002 | Perez et al. |
| 6,439,264 B1 | 8/2002 | Ellis et al. |
| 6,444,551 B1 | 9/2002 | Ku et al. |
| 6,483,264 B1 | 11/2002 | Shafer et al. |
| 6,508,264 B2 | 1/2003 | Chaffee |
| 6,530,751 B1 | 3/2003 | Song et al. |
| 6,543,073 B2 | 4/2003 | Wu |
| 6,581,223 B1 | 6/2003 | Wang |
| 6,679,686 B2 | 1/2004 | Wang |
| 6,686,711 B2 | 2/2004 | Rose et al. |
| 6,755,208 B2 | 6/2004 | Chaffee |
| 6,793,469 B2 | 9/2004 | Chung |
| 6,800,165 B2 | 10/2004 | Wang |
| 7,020,921 B2 | 4/2006 | Wang |
| 7,025,576 B2 | 4/2006 | Chaffee |
| 7,040,347 B2 | 5/2006 | Wang |
| 7,114,207 B2 | 10/2006 | Wang |
| 7,120,955 B2 | 10/2006 | Wang |
| 7,152,265 B2 | 12/2006 | Chung |
| 7,198,076 B2 * | 4/2007 | Wu .............................. 141/197 |
| 7,246,394 B2 | 7/2007 | Wang |
| 7,306,694 B2 | 12/2007 | Wang |
| 7,313,837 B2 | 1/2008 | Wang |
| 7,334,274 B2 | 2/2008 | Wang |
| 2002/0194678 A1 | 12/2002 | Chung |
| 2003/0028971 A1 | 2/2003 | Chaffee |
| 2003/0205273 A1 | 11/2003 | Chaffee |

| | | | | | | |
|---|---|---|---|---|---|---|
| 2003/0215340 | A1 | 11/2003 | Chung | WO | 00/40882 | 7/2000 |
| 2004/0037717 | A1 | 2/2004 | Wang | WO | 0187121 | 11/2001 |
| 2005/0044634 | A1 | 3/2005 | Wang | WO | 0215835 | 2/2002 |
| 2005/0118046 | A1 | 6/2005 | Wang | WO | 03093709 | 1/2003 |

FOREIGN PATENT DOCUMENTS

| | | |
|---|---|---|
| EP | 0506696 | 6/1994 |
| EP | 1364833 | 11/2003 |
| EP | 1415576 | 5/2004 |
| EP | 0852296 | 8/2008 |
| GB | 841736 | 7/1960 |
| GB | 903557 | 8/1962 |
| GB | 1381952 | 1/1975 |
| GB | 2380935 | 2/2002 |

OTHER PUBLICATIONS

International Search Report for PCT International Application No. PCT/US03/14116.

International Search Report for PCT International Application No. PCT/US02/21756.

International Search Report from PCT Application No. PCT/US2007/065988, mailed Aug. 21, 2008.

* cited by examiner

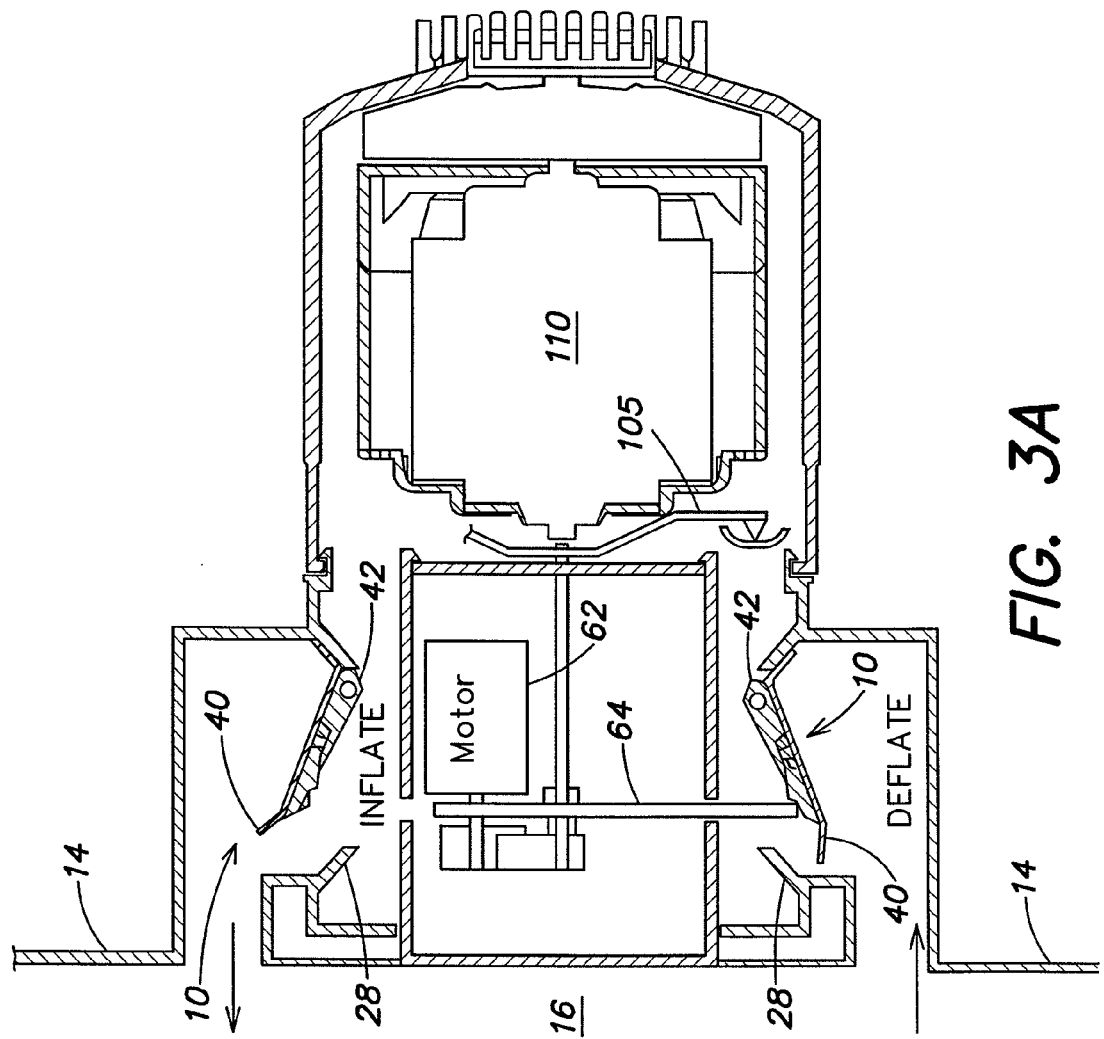

INFLATABLE DEVICE FORMING MATTRESSES AND CUSHIONS

RELATED APPLICATIONS

This application is a divisional application of and claims priority under 35 U.S.C. §120 to U.S. patent application Ser. No. 10/717,410, entitled "INFLATABLE DEVICE FORMING MATTRESSES AND CUSHIONS," filed on Nov. 18, 2003, and now U.S. Pat. No. 7,475,440. This application claims priority under 35 U.S.C. §119(e) to U.S. Provisional Application Ser. No. 60/427,151, entitled "ADJUSTABLE POSTURE SUPPORT SYSTEM," filed on Nov. 18, 2002, and U.S. Provisional Application Ser. No. 60/427,307, entitled "PRIMARY BEDDING MATTRESS," filed on Nov. 18, 2002. This application also claims priority under 35 U.S.C. §120 as a continuation-in-part to U.S. patent application Ser. No. 10/430,040, entitled "A VALVE WITH ELECTROMECHANICAL DEVICE FOR ACTUATING THE VALVE," filed on May 5, 2003, and now U.S. Pat. No. 7,644,724, which claims priority from U.S. Patent Application No. 60/377,798, entitled "VALVE WITH ELECROMECHANICAL DEVICE FOR INFLATABLE DEVICE," filed May 3, 2002. This application also claims priority under 35 U.S.C. §120 as a continuation-in-part to U.S. patent application Ser. No. 10/192,757, entitled "CONFIGURABLE INFLATABLE SUPPORT DEVICES," filed on Jul. 10, 2002, now U.S. Pat. No. 7,328,472, which claims priority from U.S. Provisional Application No. 60/304,274 entitled "COMBINATION STRUCTURES FOR AN INFLATABLE BLADDER," filed Jul. 10, 2001 and U.S. Provisional Application No. 60/374,403 entitled "A RECONFIGURALBE INFLATABLE SUPPORT DEVICE," filed Apr. 22, 2002. All of the above-mentioned, related applications are herein incorporated by reference in their entirety.

FIELD OF INVENTION

This invention relates to inflatable devices and, in particular, to inflatable support devices.

BACKGROUND OF INVENTION

Inflatable devices are used in a variety of contexts where buoyancy or a cushioned support is needed, where space is limited, or portability is desired. For example, inflatable mattresses, cushions and other body supports are used for applications such as camping, hospital bedding, and both occasional and everyday bedding in the home. Such inflatable devices have the additional advantage that the degree of inflation of the support can be adjusted to provide even support of an irregular object, such as a person. Other examples of inflatable devices include boats, rafts and other devices for use in the water where use of an inflatable device may benefit support, health, comfort, and safety.

Inflatable devices typically include valves for inflation and deflation of the devices. Valves used with inflatable devices may include self-sealing valves such as those described in U.S. Pat. No. 6,237,621, which is hereby incorporated by reference in its entirety. Inflatable devices may also include mechanisms, such as manually or electrically powered pumps, to aid in inflating and/or deflating the devices.

SUMMARY OF INVENTION

A first aspect of the invention is directed to an inflatable device, comprising: (A) an inflatable bladder; and (B) a fluid controller comprising: (i) a valve coupled to and supported by the inflatable bladder, the valve being configured and arranged to control the flow of fluid into and out of the bladder, the valve forming a seal to maintain fluid in the bladder in response to fluid pressure within the bladder; and (ii) a mechanical device configured and arranged to open the valve when the mechanical device is actuated.

The inflatable device may further comprise a compartment coupled to the bladder and configured and arranged to enclose the valve, the compartment being adapted to receive pressurized fluid from a pump. In some embodiments, the valve is a self sealing valve comprising a cover adapted to prevent the valve from opening in the presence of air pressure in the compartment, and wherein the cover and the mechanical device are configure so that when the mechanical device is actuated it biases open the cover. The self sealing valve may further comprise a diaphragm configured and arranged to form the seal in response to fluid pressure within the bladder, and wherein the diaphragm and the mechanical device are configure so that when the mechanical device is actuated it biases open the cover and the diaphragm. Optionally, the mechanical device is enclosed by the compartment. The mechanical device may be coupled to the bladder and supported by the bladder. In some embodiments, the mechanical device comprises an electromechanical device.

In some embodiments, the electromechanical device is adapted to open the valve in coordination with the pump, which is adapted to provide pressurized fluid to the compartment, to inflate the bladder. Optionally, the electromechanical device is adapted to open the valve, to deflate the bladder with fluid. In some embodiments, the pump is coupled to the compartment through a hose. The pump may be housed within an acoustical insulative material. In some embodiments, the compartment is disposed along or within the profile of the inflatable bladder.

The inflatable device may be a mattress. The mattress may comprise supplemental material, and a portion of the fluid controller is at least partially supported by the supplemental material. In some embodiments, a portion of the pump is at least partially supported by the supplemental material. The pump may be supported by the inflatable bladder.

Another aspect of the invention is directed to an inflatable mattress, comprising: (A) a first inflatable bladder; (B) a second inflatable bladder disposed adjacent to the first inflatable bladder; (C) a fluid controller comprising: (i) a first valve coupled to and supported by the first bladder, the first valve being configured and arranged to control the flow of fluid into and out of the first bladder, the first valve forming a seal to maintain fluid in the first bladder in response to fluid pressure within the first bladder; (ii) a second valve coupled to and supported by the second bladder, the second valve being configured and arranged to control the flow of fluid into and out of the first bladder, the second valve forming a seal to maintain fluid in the second bladder in response to fluid pressure within the second bladder; and (ii) an electromechanical device configured and arranged to open the first valve when the electromechanical device is in a first actuated position and to open the second valve when the electromechanical device is in a second actuated position; and (D) a compartment coupled to the bladder and configured and arranged to enclose the first valve and the second valve, the compartment being adapted to receive pressurized fluid from a pump.

In some embodiments, the compartment is flush with or within the profile of the mattress. In some embodiments, the compartment is v-shaped. Optionally, the electromechanical device is configured such that in the first actuated position and with pressurized fluid provided to the compartment, the first bladder is filled with fluid and is configured such that when the electromechanical device is in the second actuated position and pressurized fluid is provided to the compartment, the second bladder is filled with fluid. In some embodiments, the compartment is flush with or within the profile of the first bladder and the second bladder combined. The electromechanical device may comprise an actuator arm to open at least the first valve. The electromechanical device may comprise an actuator arm to open both the first valve and the second valve. In some embodiments, the actuator arm is arcurate.

Another aspect of the invention is directed to an inflatable mattress, comprising: an inflatable bladder; an articulation apparatus comprising: a support structure to support the inflatable bladder above a floor, the support structure having a plurality of regions along a length of the support structure, and at least one joint, each at least one joint being located intermediate adjacent ones of said regions.

In some embodiments, the articulation apparatus comprises a motor to move at least one of the regions relative to another of the regions. In some embodiments, the regions consist of a leg region, a torso region, and a head region. The inflatable device may be a mattress. The inflatable device may be an air mattress. The inflatable device may be adapted to deflate upon actuation of the articulation device. The inflatable device may be adapted to re-inflate upon subsequent actuation of the articulation device. In some embodiments, at least one of the regions is substantially continuous. In other embodiments, each of the regions is substantially continuous.

Another aspect of the invention is directed to an inflatable device, comprising a first inflatable bladder; and a second inflatable bladder disposed adjacent to the first bladder, the first bladder and second bladder being adapted, at corresponding first levels of inflation, to maintain a body in a first body position, and at corresponding second levels of inflation, to maintain a body in a second body position.

The inflatable device may further comprise a comfort layer disposed on at least one of the first bladder and the second bladder. In some embodiments, the first body position is prone and the second body position is reclined. In some embodiments, the first level of inflation of the first bladder is greater than the second level of inflation of the first bladder, and the first level of inflation of the second bladder is greater than the second level of inflation of the second bladder. The first bladder may be adapted to support the torso of a user and the second bladder is a pillow.

Yet another aspect of the invention is directed to an inflatable body support device, comprising: an inflatable bladder; and a base releasably connected the inflatable bladder and adapted to support the inflatable bladder, the base comprising a compartment disposed beneath the inflatable bladder. The inflatable body support device may further comprise a frame releasably connected to the base and supporting the inflatable bladder above the compartment.

The inflatable bladder may be hingedly coupled to the base. In some embodiments, the inflatable bladder is hingedly coupled to the base though a frame that is hingedly connected to the base. In some embodiments, the inflatable bladder is an air mattress. In other embodiments, the inflatable bladder is a chair. The frame may be adapted to one of slide, rotate or elevate the inflatable bladder relative the base. In some embodiments, the inflatable body support device further comprises one of a rail, guides or tracks to enable one of the sliding, rotating and elevating of the inflatable bladder relative the base. In some embodiments, the inflatable body support device further comprises a locking mechanism to maintain the inflatable bladder in an elevated position.

Yet another aspect of the invention is directed to a method of using a configurable inflatable device comprising an inflatable bladder and at least one shape-defining member that combines with the inflatable bladder such that the overall shape of the inflatable bladder in an inflated condition and in combination with the shape-defining member is substantially different from an inflated shape of the inflatable bladder alone, comprising acts of: adapting the at least one shape-defining member to correspond to a first selected shape; inflating the inflatable bladder to attain the first selected shape; adapting the at least one shape-defining member to correspond to a second selected shape; and inflating or deflating the bladder to attain the second selected shape.

The method may further comprise an act of using the inflatable device with a first part of the body while in the first selected shape and using the inflatable device with a second part of the body while in the second selected shape. In some embodiments, the first act of adapting forms a device suitable for use with the head and the second act of adapting forms a device for use with one of the back and the legs. In some embodiments, the act of inflating the bladder to a first selected shape forms a bolster pillow of a first size, and the act of inflating the bladder to a second selected shape forms a bolster pillow of a second size. In some embodiments, at least one of the first shape and the second shape is non-cylindrical. In some embodiments, at least one fastener is directly connected to the inflatable bladder. In some embodiments, the act of adapting the at least one shape-defining member to correspond to a second selected shape comprises adjusting a rigid member.

Another aspect of the invention is directed to a method of using a configurable inflatable device comprising a bladder, comprising acts of: adapting the bladder to correspond to a first selected shape; inflating the inflatable bladder to attain the first selected shape; adapting the bladder to correspond to a second selected shape; and inflating or deflating the bladder to attain the second selected shape. In some embodiments, one of the acts of adapting the bladder to correspond to a first selected shape and adapting the bladder to correspond to a second selected shape, comprises an act of folding the bladder.

Yet another aspect of the invention is directed to an inflatable air mattress, comprising: an inflatable bladder; and a heater adjacent to the inflatable bladder. In some embodiment, the heater is comprised of at least one resistive strip having an adhesive strip disposed on the bladder. In some embodiments, the bladder has a length, and the at least one resistive strip runs along substantially the entire length of the bladder. The heater may be uniformly disposed along a dimension of the mattress. In some embodiments, the heater is disposed along only a portion of the mattress.

Still another aspect of the invention is directed to a method of using an inflatable device comprising an inflatable bladder, a surface layer, and a first intermediary layer disposed between the bladder and the surface layer, comprising acts of: removing the first intermediary layer; and placing a second intermediary layer in the location disposed between the bladder and the surface layer. In some embodiments, the first intermediary layer comprises at least of one of the following materials: foam, cotton and down. In some embodiments, the first intermediary layer and the second intermediary layer comprise the same materials as one another. In some embodiments, the first intermediary layer and the second intermediary layer comprise different materials than one another.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A is a cross-sectional view of another embodiment of the invention, comprising a fluid moving device, two valves and an actuator device in a first condition;

DETAILED DESCRIPTION

Figure 1:
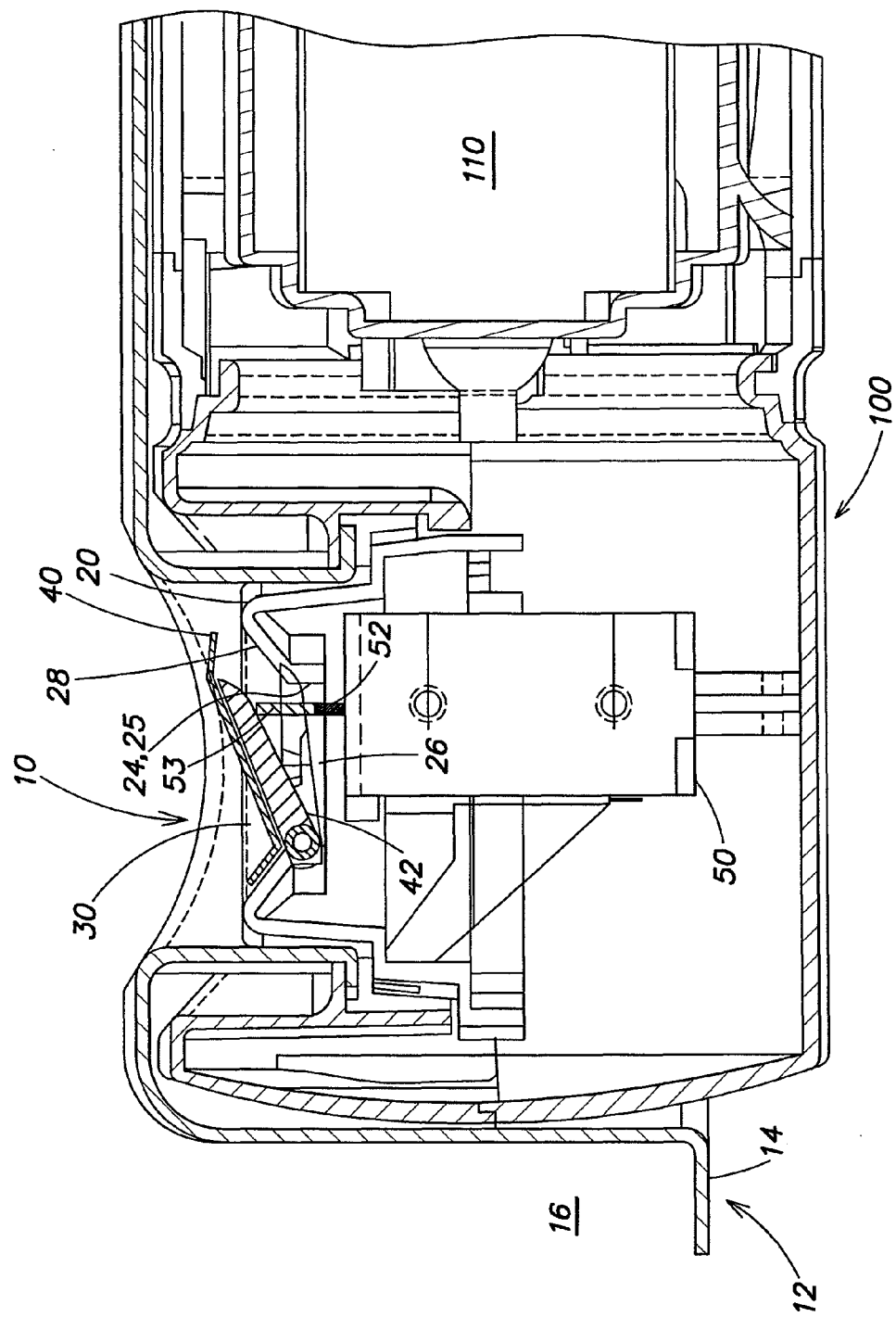
FIG. 1 is a cross-sectional view of one embodiment of a fluid moving device comprising a valve and an electromechanical device of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As used herein, "inflatable" is to be understood as able to be inflated by any fluid such as, for example, a gas, air, a liquid, and the like. As used herein, an "inflatable device" comprises at least one fluid impermeable bladder that can be inflated and sealed, and may comprise many shapes, sizes, constructions, and materials.

An aspect of the invention relates to a self-sealing valve that can be used in conjunction with an electromechanical device to bias open the valve. In particular, in one embodiment, the invention relates to a self-sealing valve that can open under the pressure of a fluid moving device to inflate an inflatable device, and that can close under pressure from fluid within the inflatable device, without any assistance from an electromechanical device. In this embodiment, the electromechanical device is used to bias open the valve to at least partially deflate the inflatable device, for example, to adjust an amount of fluid within the inflatable device, and also to substantially deflate the inflatable device. For example, the self-sealing valve can be opened by the electromechanical device for a short duration to adjust the amount of fluid in the inflatable device, and can be biased open to substantially deflate the inflatable device. Alternatively, in this or any of the following embodiments described herein, the electromechanical device may also be used to open the valve during inflation.

In another embodiment, the invention comprises an electromechanical device coupled to a self-sealing valve, wherein the electromechanical device comprises an actuator arm that is not connected to the valve, but instead can be moved into contact with the self-sealing valve to bias open the self-sealing valve. In this embodiment, in the closed position, or any position other than an open position, the electromechanical device and the actuator arm may not be in contact with the self-sealing valve assembly. Another embodiment of the invention comprises an electromechanical device and two valve assemblies, one for each fluid impermeable bladder of an inflatable device comprising at least two fluid impermeable bladders. In this embodiment, the electromechanical device can be used to bias open one self-sealing valve at a time, to adjust an amount of fluid within the fluid impermeable bladder coupled to the respective self-sealing valve, or to substantially deflate the fluid impermeable bladder. Other embodiments of the invention will be described infra.

As will be disclosed herein, some of the advantages of the various embodiments of the invention include substantially reduced power requirements for the electromechanical actuation device and substantially reduced cycles of operation for the electromechanical actuation device, compared with conventional valve and solenoid combinations. Another advantage is that a plurality of electromechanical devices including, for example, solenoids and motors can be used in combination with at least one self-sealing valve. Still another advantage is that the valve and electromechanical device of the invention can flexibly be used to provide a plurality of adjustment functions, such as, providing minor inflation/deflation adjustments for comfort control of an inflatable device, as well as substantial inflation or deflation of the inflatable device.

By contrast, in conventional apparatus, solenoids have been used in conjunction with valves for inflatable devices. In such inflatable devices, the valves typically employ a spring to maintain the valves in a normally biased closed position. A solenoid is typically provided with the valve and is typically sized and arranged to overcome the force of the spring biasing the valve closed so as to open the valve. Such solenoids are typically center mounted with the diaphragm of the valve. In such arrangements, the force of the spring biasing the valve closed has to be greater than a maximum internal air pressure within an inflatable device, so as to maintain the valve in a closed position when the inflatable device is inflated. Accordingly, the solenoid has to be sized and arranged to provide a force greater than the force provided by the spring in order to open the valve. In addition, since the spring normally biases the valve closed, the solenoid typically has to be energized to open the valve both for the purpose of inflating an inflatable device and also for the purpose of exhausting air from the inflatable device.

This arrangement results in a long operating cycle of the solenoid to either inflate the inflatable device or deflate the inflatable device, since the solenoid must be energized for the entire time of inflation or deflation. In addition, the solenoid has to be sized so as to provide enough force to overcome the force provided by the spring maintaining the valve in a closed position, and therefore is typically a large, power consuming, and expensive solenoid device. In addition, this arrangement suffers from the infirmity that the amount of fluid that can be provided to the inflatable device and exhausted from the inflatable device are typically the same, since the valve can typically only be opened to a single position or closed by the solenoid. Further, the solenoid electromechanical assembly typically restricts the fluid pathway, thus requiring a substantial inflation or deflation time for the inflatable device. For example, Select Comfort® makes an inflatable mattress with this typical arrangement that takes on the order of about 10 minutes to inflate. Thus, this arrangement suffers from the infirmity of not being able to control an amount of fluid within the inflatable device in sufficient time frames. In particular, the time to fine tune the level of inflation of an inflatable device by this arrangement is typically too long.

It is to be appreciated that the valve and electromechanical device combination of the invention can be used as an alternative or a replacement to the stand alone valve of an inflatable device. For example, the valve and electromechanical device of the invention can be used within the fluid moving device and valve combination disclosed in U.S. Pat. Nos. 5,267,363 (hereinafter the "'363 patent") and 5,367,726 (hereinafter the "'726"), which are herein incorporated by reference, to inflate and control an amount of fluid within an inflatable mattress. It should also be appreciated that although the valve and electromechanical device combination of the invention is illustrated and can be used to inflate, deflate and control an amount of fluid within generally an inflatable device, the combination can be used with any inflatable device, such as, for example: inflatable furniture, or sporting items such as chairs, mattresses and pillows; inflatable safety devices, such as life preservers, barriers, bumpers, and pads; inflatable medical devices, such as supports, casts, and braces; inflatable luggage devices such as, padding and luggage lining material; inflatable recreational devices, such as swimming aids, floats, tubes, and rings; inflated vehicles and vehicle components, such as boats, rafts, and tires; inflatable support structures, such as buildings, portable enclosures, platforms, ramps, and the like; inflatable body support devices, such as seats, back supports, body pillows, and the like.

It should also be appreciated that any of the valve and electromechanical device combinations of the invention, as disclosed infra, can be used in conjunction with any fluid moving device, such as that disclosed in U.S. Pat. No. 6,237,653 herein incorporated by reference; that disclosed in pending U.S. patent application Ser. No. 09/859,706, herein incorporated by reference; and that disclosed in pending U.S. patent application Ser. No. 10/113,836 herein incorporated by reference.

It is further to be appreciated that the valve and electromechanical device combination of the invention is typically used over the pressure range anywhere from approximately 0 to 1 pound per square inch (hereinafter "psi"). However, it should also be appreciated that the valve and electromechanical device combination of the invention can be used at any pressure above about 1 psi and at which the valve and electromechanical device still function properly such as, for example, to provide a seal of the inflatable device which can be biased open by the electromechanical device, and that such pressure ranges are within the scope of the invention. It is to be understood that as used herein, a range of approximately 0 to about 1 psi is understood to be a low pressure range, a range of approximately 1 to 2 psi is understood to be a medium pressure range, and a range of approximately 2 to 5 psi is understood to be a relatively high pressure range.

Referring now to FIG. 1, there is illustrated a cross-sectional view of one embodiment of a valve and electromechanical device combination according to aspects of the invention. In particular, there is illustrated a fluid moving device 100 that can be at least partially within an inflatable device 12 or coupled to the inflatable device 12 having an outer wall 14 that is a fluid impermeable bladder. In particular, the fluid impermeable bladder 14 separates an exterior of the inflatable device from an interior 16 of the inflatable device. In this embodiment, the valve 10 comprises an outer wall 20 and a valve wall 24 defining a circular opening 26 through which a fluid may be transferred to and from the interior 16 of the inflatable device. The circular opening preferably has a diameter of about 1" or greater. However, it should be appreciated that the diameter can also be less than approximately 1", such as, in the range of ⅜" to ¾" so as to be coupled to a tubing having a diameter in this range. The valve also comprises a tapered wall from the opening 26 of diameter 25 to the outer wall 20 of increased diameter 30, to create a tapered valve seat 28. The self-sealing valve also comprises a diaphragm 40 that is generally circular, deformable, flexible, and for this embodiment has a diameter that is less than the larger diameter region 30, and greater than the smaller diameter 25 of opening 26.

However, it should be appreciated that according to the invention, the diaphragm 40 can be of any shape, material, size and construction so long as it provides a sufficient seal of the inflatable device. In the illustrated embodiment, the valve 10 comprises a self-sealing valve, in which the diaphragm 40, in the closed position, mates with the valve seat 28 to seal the opening 26. In one embodiment, a flexible diaphragm assembly comprises diaphragm 40 which is supported by a diaphragm support 42. In the illustrated embodiment, the diaphragm support 42 is hingedly connected to a wall 24, so that it can be opened and closed about a hinge point connection. However, it should be appreciated that the diaphragm support 42 in combination with the diaphragm 40 of the valve 10, can be any of a plurality of structures that may be self-sealing, such as disclosed in U.S. Pat. No. 6,237,621, herein incorporated by reference. In other words, the flexible diaphragm assembly may be constructed in any manner that allows the diaphragm to open under the influence of fluid provided by the fluid moving device 110, and to close at a suitable fluid pressure within the inflatable device 16, in the absence of fluid from the fluid moving device. It should further be appreciated that the self-sealing valve 10 can comprise many different variations, as known to those of skill in the art such as, for example, a flexible diaphragm without a diaphragm support.

Typically, the diaphragm support 42 is constructed from a relatively rigid plastic material, and the diaphragm 40 may be connected to the diaphragm support in any manner that permits the diaphragm 40 to be positioned within the opening 26, and to open from the influence of a fluid provided by the fluid moving device 110 and also from an influence provided by the electromechanical device 50.

Thus, according to one embodiment of the invention, the valve 10 is a self-sealing valve that opens under the influence of a fluid from the fluid moving device 110 to pressurize the inflatable device 16, and that closes to retain fluid within the inflatable device 16 in the absence of such fluid. In this embodiment, the self-seal is accomplished by a fluid pressure within the inflatable device 12 biasing the diaphragm 40 against the valve seat 28.

It is to be appreciated that the electromechanical device 50 may be any device that is capable of biasing the self-sealing valve 10 to an open position. Some examples of electromechanical devices that may be used with the invention include solenoids and electrical motors, such as motors that have at least two positions, which can be arranged to correspond to an open position and a closed position of the self-sealing valve 10. For example, as will be discussed in further detail infra, an electric motor can be used to bias open the self-sealing valve in a first position, and in a second position to allow the self-sealing valve 10 to close. Alternatively, another example is an electric motor comprising a suitable arrangement of gears having at least two positions, that can be adapted with the self-sealing valve to bias open and allow the valve 10 to close.

In the embodiment of FIG. 1, the electromechanical device 50 includes an actuator arm 52, that is biased by the electromechanical device 50 to open the valve 10 (as illustrated) by acting on a portion of the valve. As illustrated in FIG. 1, in one embodiment of the invention, the actuator arm 52 is coupled to, is directly connected to, or is a portion of a moving portion of a solenoid 50, which can be energized to bias the actuator arm to open the valve 10, by biasing the diaphragm 40 away from the valve seat 28. It is to be appreciated that the actuator arm 52 may act on any portion of the valve 10, so as to bias the valve 10 open, such as against the diaphragm 40 or against the diaphragm support 42. It is also to be appreciated that according to this embodiment of the invention, there is a reduced force required to bias open the valve 10. Since the diaphragm support 42 is mounted by a hinge point to the frame 20, the actuator arm 52 can act on a portion of the diaphragm 40 or the diaphragm support 42 opposite the hinge point. In particular, the actuator arm 52 acts on a portion of the diaphragm 40 or the diaphragm support 42 remote from the hinge point of the valve 10 to the wall 24. Accordingly, the combination of the solenoid 50 and the self-sealing valve 10 have the advantage that there is less force needed to actuate the valve to the open position at the portion of the valve remote from the hinge point, than at the hinge point. In particular, the further away from the hinge point that the actuator arm contacts the diaphragm 40 or the valve arm 42, the smaller the force that is needed to bias the valve 10 to an open position with the electromechanical device.

According to one embodiment of the invention, the electromechanical device 50 and the actuator arm 52 are energized to move either of the diaphragm 40 and the support arm 42 away from the valve seat 28, so as to break the seal of the self-sealing valve 10, so as to either regulate or substantially alter an amount of fluid within the inflatable device 12. In particular, a shaded portion 53 of the actuator arm 52 illustrates the valve arm in a first position which is used to substantially bias open the self-sealing valve 10. In addition, a darkened portion of the actuator arm 52 illustrates the valve in a second position, in which it has been allowed to close by the solenoid 50 and the actuator arm 52, such that the actuator arm no longer is biasing the diaphragm 40 or the diaphragm support 42 substantially away from the valve seat. Accordingly, it is to be appreciated that the first position of the actuator arm of the solenoid 50 can be used to substantially open the self-sealing valve, and that the second position of the actuator arm can be used to allow the valve to operate under its normal condition, so as to open under the influence of fluid provided by fluid moving device 110, and so as to close upon sufficient fluid within the inflatable device 12. It is to be appreciated that the first position of the actuator arm can be configured so as to substantially open the valve for a longer duration so as to substantially deflate the inflatable device 12, or it can be configured to substantially open the valve for a short duration so as to regulate an amount of fluid within the inflatable device 12. In other words, to provide for controlled fluid pressure within the inflatable device, for example, to adjust a comfort level of the inflatable device. As previously stated, any embodiment herein described may also employ activation of the electromechanical device during inflation.

Figure 2:
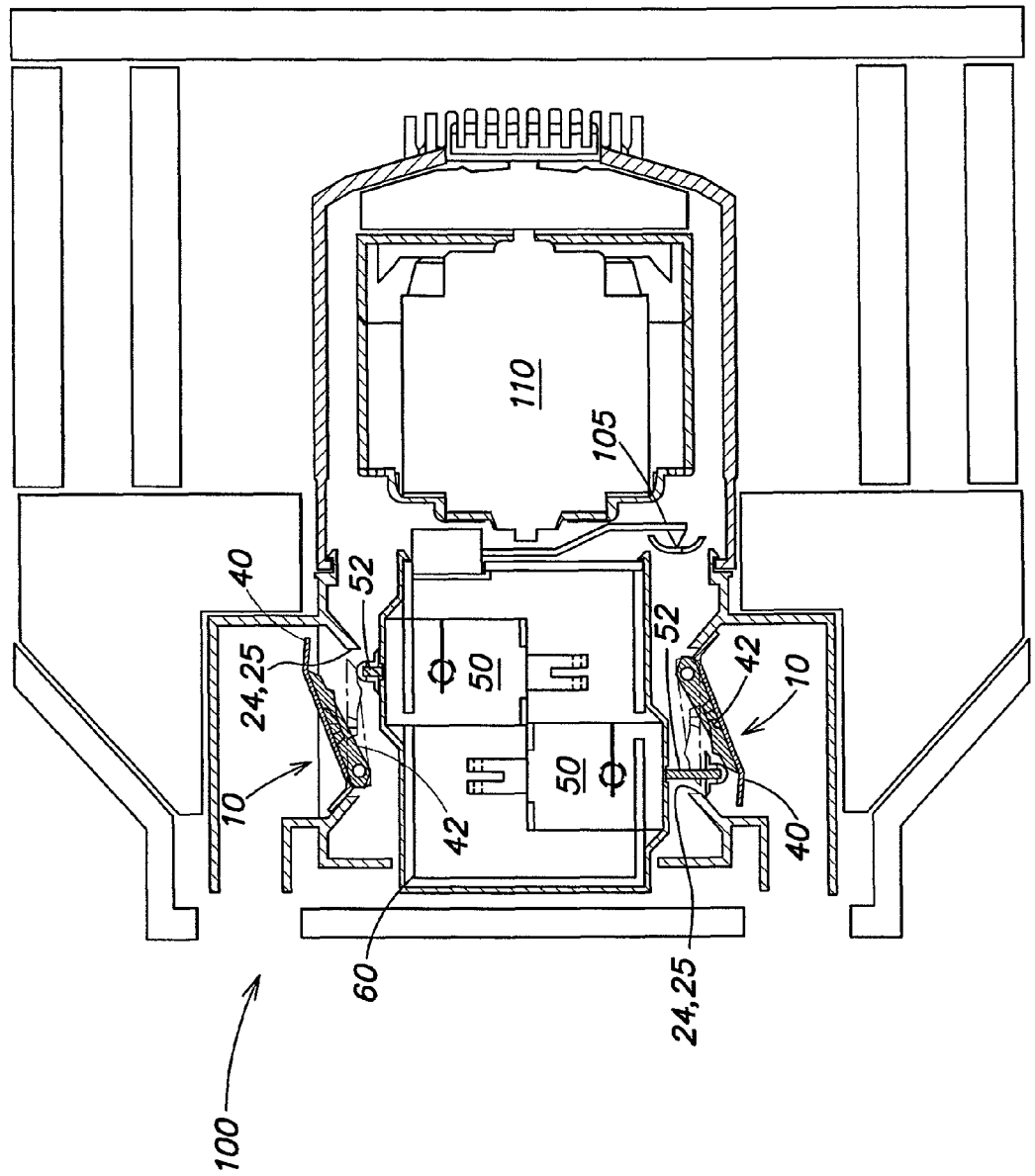
FIG. 2 is a cross-sectional view of another embodiment of a fluid moving device comprising two valves and a plurality of actuating devices of the invention.

Referring to FIG. 2, there is illustrated in cross section another embodiment of a self-sealing valve in combination with an electromechanical device of the invention. It is to be appreciated that like reference numbers in FIG. 2 to FIG. 1, correspond to like parts and that for the sake of brevity the description of each part will not herein be repeated. In the embodiment of FIG. 2, the combination of the self-sealing valve and electromechanical device of the invention are part of a fluid control device 100 that inflates, deflates and regulates an amount of fluid within an inflatable device. The fluid control device 100 includes a pump 110 and multiple self-sealing valves 10, in combination with respective electromechanical devices 50. In the embodiment of FIG. 2, each combination of a self-sealing valve and an electromechanical device operates independently, however it is to be appreciated that a plurality of self-sealing valves may operate in combination with one or more electromechanical devices such as illustrated in FIGS. 3A-3B, and that such combinations may also operate independently or dependently.

As is illustrated in FIG. 2, in one illustrative condition, the lower valve is biased to a substantially opened position by actuator arm 52 and solenoid 50, so as to at least partially exhaust air from a fluid impermeable bladder coupled to the lower valve. In addition, as is illustrated in FIG. 2, in another illustrative condition, the upper valve 10 can be opened under the influence of fluid provided by the pump 110, while the actuator arm is in a position allowing the valve 10 to operate in a normal manner (illustrated as opening up under the influence of fluid from the fluid moving device 100), so as to inflate the fluid impermeable bladder coupled to the upper valve. It is to be appreciated that in the illustrated condition of the upper valve, operating in a normal manner (not under influence from the electromechanical device) that the valve 10 can also close to self-seal the fluid impermeable bladder, in the absence of fluid form the fluid moving device, and with sufficient fluid in the impermeable bladder. It is also to be appreciated that either self-sealing valve and electromechanical device combinations can operate in either manner, and that the conditions of the valves illustrated in FIG. 2 are for illustration purposes only. With this arrangement, the fluid control device 100 is used to inflate, deflate, and adjust an amount of fluid within two fluid impermeable bladders, each coupled to a respective one of the upper and lower self-sealing valves. Accordingly, the embodiment of the invention as illustrated in FIG. 2 is useful for inflatable devices with at least 2 bladders such as, for example, a double inflatable mattress with separate comfort zones for two different users, each zone having a separate bladder.

The embodiment of FIG. 2 may also comprise a third electromechanical device 60, which biases a control arm 105 to one of two positions to either allow air to be provided to or exhausted from a fluid impermeable bladder coupled to the upper valve, or the fluid impermeable bladder coupled to the lower valve. In particular, third electromechanical device 60 biases rotating arm 105 so as to seal off one of the self-sealing valves from the fluid moving device, so that fluid can only be provided to or exhausted from one fluid impermeable bladder at a time. For example, the upper fluid impermeable bladder may be filled with fluid from the fluid moving device 110, wherein the self-sealing valve opens up under pressure of fluid provided by the fluid moving device 110. With this condition, the rotating arm 105 is rotated under influence from the electromechanical device to a position to seal of the lower self-sealing valve from the fluid moving device, such that fluid is prevented from being provided to the fluid impermeable bladder coupled to the lower self-sealing valve. It is to be appreciated that with this arrangement, the rotating arm can also be rotated to a second position to seal off the upper self-sealing valve from the fluid moving device, such that fluid is prevented from being provided to the fluid impermeable bladder coupled to the upper self-sealing valve. In the second position of the rotating arm, fluid can be exhausted from or provided to the impermeable bladder coupled to the lower self-sealing valve. In other words, in one embodiment of the fluid controller device 100 of FIG. 2, only one of the two fluid impermeable bladders may be inflated or exhausted at any one time. It is thus to be appreciated that with the arrangement of FIG. 2, one fluid impermeable bladder can not be inflated at the same time that the second bladder is to be deflated.

Figure 3B:
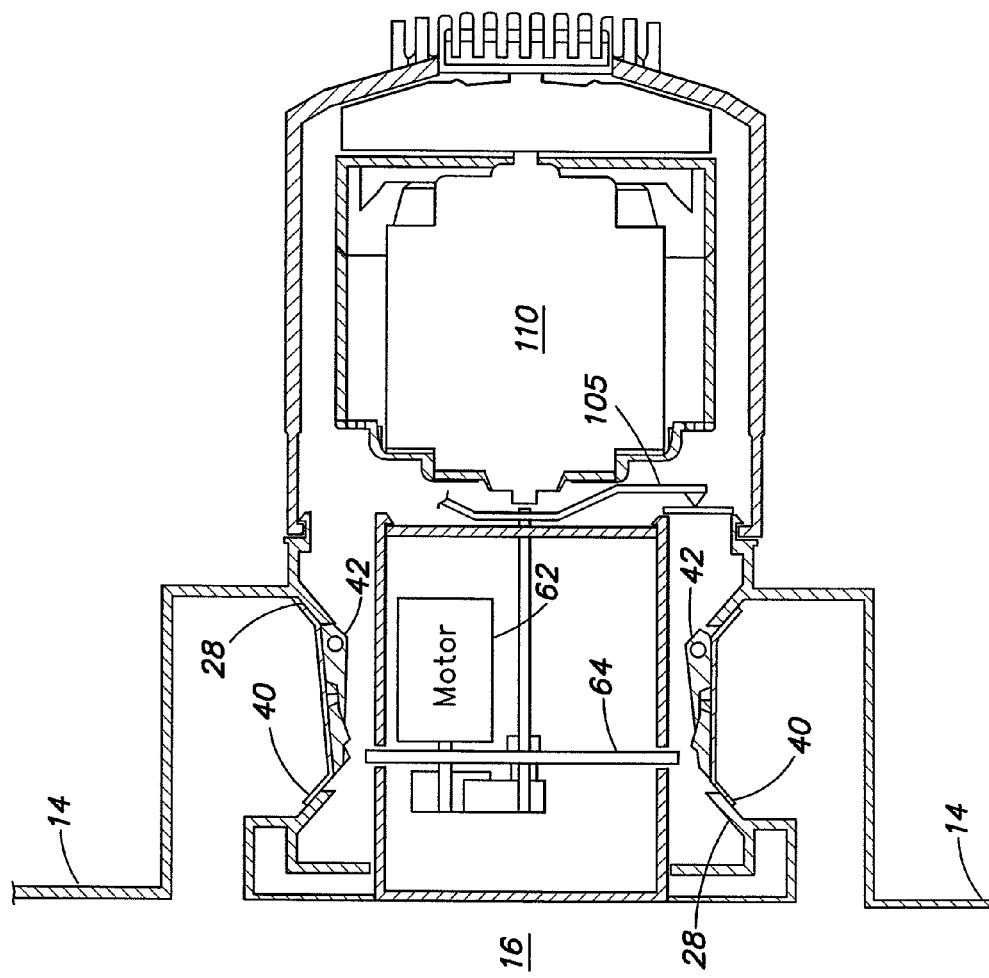
FIG. 3B illustrates the embodiment of the invention of FIG. 3A in a second condition.

Referring now to FIG. 3A and FIG. 3B, there is illustrated in cross section another embodiment of the invention having at least two different operating positions. In particular, although the electromechanical device of the invention can comprise a solenoid as discussed above, it may also comprise a motor 62 that can be used to bias the actuator arm 64. It is to be appreciated that like reference numbers in FIG. 3A and FIG. 3B to that of FIGS. 1 and 2, represent like parts, and the description of each part is not necessarily repeated for the sake of brevity. In the embodiment of FIG. 3A and FIG. 3B, the motor and actuator arm have at least two positions that can each be used to operate on a respective self-sealing valve 10. In particular, as is illustrated in FIG. 3A, in a first position the motor biases the actuator arm 64 so as to substantially move the flexible diaphragm of the lower self-sealing valve away from the valve seat 28 so as to substantially open the fluid pathway, to at least partially exhaust air from an inflatable bladder coupled to the lower self-sealing valve. In addition, the motor can move the actuator arm to a second position so as to allow the lower valve to operate under normal self-sealing conditions, such as to self seal with sufficient fluid within the fluid impermeable bladder coupled to the lower self-sealing valve, and so as to open under sufficient pressure of fluid provided by the fluid moving device 110. In one embodiment, in the second position of the motor 62, the actuator arm is configured to bias the upper valve to a substantially open position (with the flexible diaphragm at least partially moved away from the valve seat 28), so as to at least partially exhaust air from an inflatable bladder coupled to the upper self-sealing valve. Alternatively, in another embodiment of the invention, the second position of the motor and actuator arm may be a position in which neither self-sealing valve is biased open by the actuator arm, as is illustrated in FIG. 3B. In this embodiment, the motor may also comprise a third position, in which the motor can bias the actuator arm to a position so as to substantially open the upper self-sealing valve, so as to at least partially exhaust air from a fluid impermeable bladder coupled to the upper self-sealing valve.

In one embodiment, the motor can also be used to rotate a rotating arm 105 so as to seal off one of the self-sealing valves from the fluid moving device, so that fluid can only be provided to one fluidly impermeable bladder at a time. For example, as illustrated in FIG. 3A, the upper fluid impermeable bladder may be filled by fluid from the fluid moving device 110, wherein the self-sealing valve opens up under pressure of fluid provided by the fluid moving device 110. For this position, the rotating arm 105 is rotated under influence from the motor to a position to seal off the lower self-sealing valve from the fluid moving device, such that fluid is prevented from being provided to the fluid impermeable bladder coupled to the lower self-sealing valve. It is to be appreciated that with this arrangement, the rotating arm can also be rotated to a second position to seal off the upper self-sealing valve from the fluid moving device, such that fluid is prevented from being provided to the fluid impermeable bladder coupled to the upper self-sealing valve. In this second position of the rotating arm, fluid can be exhausted from or provided to the fluid impermeable bladder coupled to the lower self-sealing valve.

With any of the embodiments discussed above, a method of inflating and deflating at least one fluid impermeable bladder and regulating an amount of fluid within the at least one fluid impermeable is provided by the invention. In particular, in one embodiment, the self-sealing valve can be biased open under the influence of fluid provided by the fluid moving device so as to inflate the inflatable device. Upon sufficient fluid pressure within the inflatable device, the self-sealing valve is biased to the closed position by the fluid pressure within the inflatable device. An electromechanical device is used to regulate an amount of fluid within the inflatable device or to substantially deflate an amount of fluid within the inflatable device. In addition, for embodiments of inflatable devices comprising at least two bladders, the above acts can be supplemented by providing fluid through a second electromechanical device and self-sealing valve to a second fluid impermeable bladder, and the second electromechanical device and self-sealing valve can be used so as to either regulate an amount of fluid within the inflatable device or to substantially alter the amount of fluid from within the second fluid impermeable bladder.

Figure 4A:
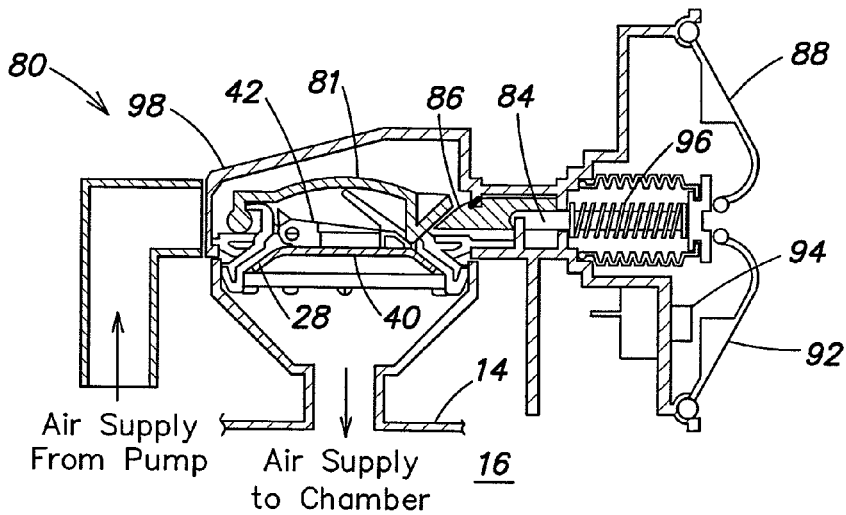
FIGS. 4A-4C illustrate another embodiment of an assembly of an actuator in combination with a self-sealing valve of the invention.
Figure 4B:
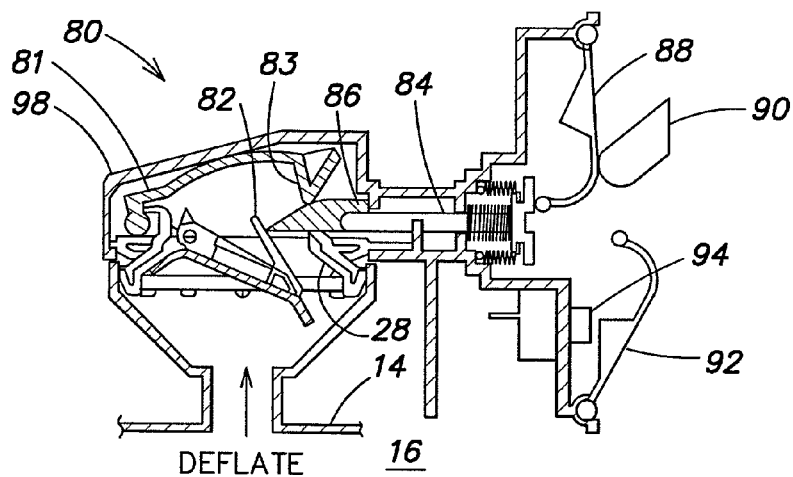
Figure 4C:
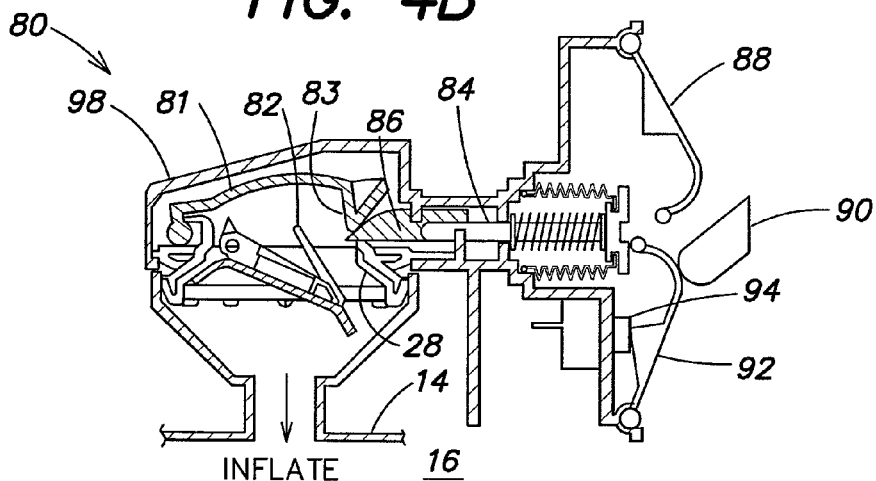

FIGS. 4A-4C illustrate another embodiment of an assembly of an electromechanical device in combination with a self-sealing valve of the invention. This embodiment comprises a self-sealing valve assembly 80, such as, as has been described infra. The self-sealing valve assembly comprises a flexible diaphragm 40 and a diaphragm support 42 that positions the diaphragm within an opening through which fluid can be supplied to or exhausted from an inside 16 of fluid impermeable bladder 14. The self-sealing valve assembly also includes a projecting arm 82 from the diaphragm support 42, that is configured to interact with a portion 86 of an actuator arm 84. The assembly also comprises a cover 81 having a surface 83 that also interacts with the portion 86 of the actuator arm 84. The actuator arm 84 and portion 86 are configured to bias the cover 81 upward so as to open the cover, and are also configured to bias the projecting arm 82 so as to push the diaphragm support 42 and diaphragm 40 at least partially away from valve seat 28, as illustrated in FIG. 4B, when a deflate lever 88 is depressed, for example, by a finger 90 of a user. The assembly also comprises an inflate lever 92, which can also be depressed by the finger 90 of the user so as to move the actuator arm into contact with the surface 83 of the cover 81 so as to open the cover, as illustrated in FIG. 4C. While the lever 92 is illustrated as being moved by a finger, an electromechanical device may be used to move the actuator arm. The inflate lever is also configured, when depressed, to contact and bias a power switch 94 to energize a fluid moving device to supply fluid from the fluid moving device to the self-sealing valve 80, as is also illustrated in FIG. 4C.

In the illustrated embodiment of FIGS. 4A-4C, the actuator arm also comprises spring assembly 96, which maintains the actuator arm 84 in an at rest position, which is disengaged from the cover 81 and the self-sealing valve 80. By depressing the deflate lever 88, the actuator arm is urged into contact with the surface 83 of the cover 81 and the projecting arm 82 of the self-sealing valve assembly, so as to bias open the cover and to bias open the self-sealing valve 80 for the purpose of deflating the inflatable device, as illustrated in FIG. 4B. By depressing the inflate level 92, the actuator arm 84 is urged into contact with the surface 83 of the cover 81 so as to bias open the cover to inflate the inflatable device as illustrated in FIG. 4C. As illustrated in FIG. 4C, the inflate lever both turns on the fluid moving device to provide fluid to the inflatable device and also biases open the cover for the purpose of providing fluid to the inflatable device.

In this embodiment, the self-sealing valve is configured to open under sufficient fluid pressure from the fluid moving device, when the cover is biased open by depressing the inflate lever, in the absence of any biasing open of the self-sealing valve from the actuator arm 84. The self-sealing valve is also configured to close in the absence of such fluid pressure from the fluid moving device and in the absence of any bias from the actuator device, with sufficient fluid pressure within the fluid impermeable bladder 16, to a closed position. The self-sealing valve is further configured to at least partially open to allow fluid to escape through the self-sealing valve from the inflatable device to regulate an amount of fluid within the inflatable device, when the cover and the self-sealing valve is biased open by the actuator arm, by depressing the inflate lever.

It should be appreciated that although FIGS. 4A-4C illustrate an embodiment of a actuator device and valve assembly comprising a single self-sealing valve, there may be provided a plurality of such self-sealing valves, for example along a row within a common housing 98, all coupled to the fluid moving device, and all provided with a respective deflate lever 88, inflate lever 92, and spring assembly 96 comprising actuator arm 84, so as to be able to respectively bias open and close each self-sealing valve assembly for the purpose of inflating and deflating a plurality of fluid impermeable bladders within an inflatable device. In other words, the assembly of FIGS. 4A-4C can be used to fill, deflate and control a fluid level within an inflatable device that comprises a plurality of fluid impermeable bladders, each having an assembly as illustrated in FIGS. 4A-4C, so as to be able to control the fluid pressure within each fluid impermeable bladder independently, and with the added advantage of only having to use a single fluid moving device. It is to be appreciated that the fluid moving device may be located remotely from the self-sealing valve and the electromechanical assembly.

Figure 5A:
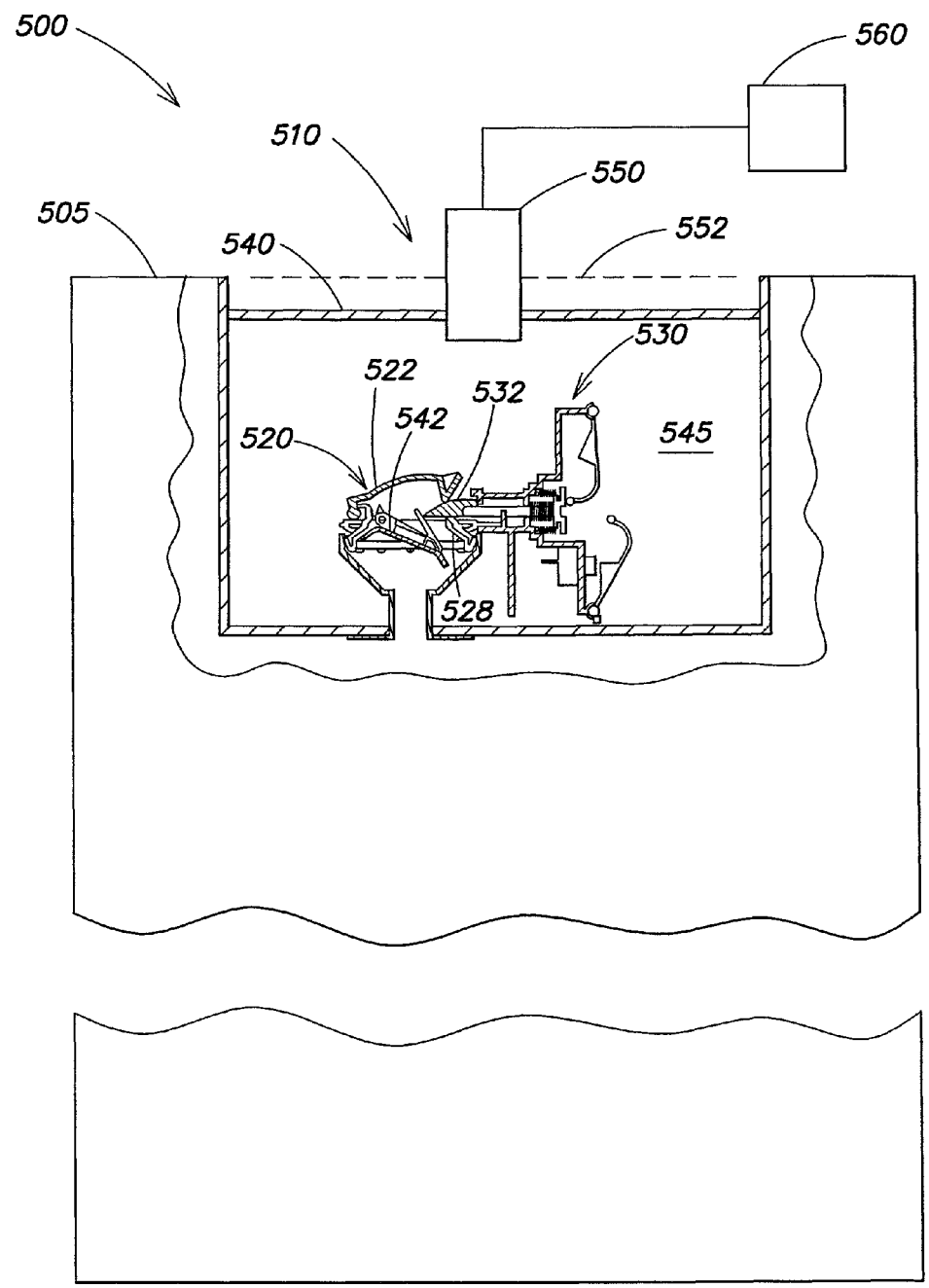
FIGS. 5A-5C illustrate exemplary embodiments of inflatable devices in which a portion of a fluid controller is coupled to an inflatable bladder and at least a portion of the fluid controller is supported by the inflatable bladder.

FIG. 5A is a schematic illustration of an embodiment of an inflatable device 500 according to another aspect of the invention in which a portion of a fluid controller 510 is coupled to an inflatable bladder 505 and is physically supported by inflatable bladder 505. Fluid controller 510 is comprised of valve 520, an electromechanical device 530, a sealing barrier 540, a pump 550, and electronics for powering the pump on and off. In the illustrated embodiment, inflatable device 500 is an inflatable air mattress, which can be provided in a variety of shapes and sizes, such as, for example, those common to everyday bedding, known generally as "twin," "full," "queen" and "king" sizes. However, the invention is not limited to mattresses and any suitable inflatable device may be used to support the portion of the fluid controller according to the present aspect of the invention.

According to the present aspect of the invention, at least valve 520 is coupled to the inflatable bladder 505 and is supported by the bladder 505. Valve 520 may be a self sealing valve as described above with reference to FIGS. 4A-4C and configured in a similar manner. Valve 520 is arranged such that an actuator arm 532 of electromechanical device 530 can bias the cover 522 upward so as to open the cover, and push the diaphragm 542 at least partially away from valve seat 528 so as to allow inflation of bladder 505 if pressured air is provided from pump 550, and deflation of the bladder in the absence of pressurized air. For example, the air released during deflation may exit through the pump, although pump may or may not actively draw the air out.

Electromechanical device 530 operates to open valve 520 when the inflatable device is to be inflated. In some embodiment, electromechanical device 530 is located within compartment 545. It is to be appreciated that valve 520 can be adapted to close due to air pressure in compartment without actuation of electromechanical device, as described herein above. In some embodiments, it is advantageous that electromechanical device 530 be coupled to the bladder and supported by the bladder. The electromechanical device may, for example, be a motor or a solenoid as described above. Electricity can be provided to the electromechanical device in any suitable manner, such as, through a port that maintains the ability of the pump to suitably pressurize the compartment, as described below. In some embodiments electromechanical device 530 may be replaced by a non-electric, mechanical device such that the device can be operated by pressing a button mechanically coupled to the valve.

Barrier 540 may be any suitable structure capable of forming a compartment 545 capable of limiting the flow of air from the inside of the compartment to the ambient surrounding of the bladder, such that when pressurized air is provided from the pump to the compartment, sufficient pressure can be achieved to fill inflatable bladder 505. In some embodiments, the compartment is air tight and the pump couples to the compartment in an airtight manner. In embodiments in which valve 520 is a self sealing valve, the pressure provided by pump 550 may push the diaphragm open to fill the bladder. However, in other embodiments, as described above the electromechanical device pushes the diaphragm open to allow filling of the bladder. In some embodiments, barrier 540 is capable of connecting to pump 550. However, a hose may be used to couple the pump to the barrier.

Pump 550 may be connected directly to inflatable device 500 or may be located remotely and coupled to the inflatable device by a suitable hose (not shown). In some applications, locating of the motor in a location remote from the mattress may be desirable to reduce the amount of noise from the motor that is perceivable by a person lying on the inflatable device 500. For example a pump located remotely may be placed on the floor directly underneath the bed or in a location across a room from the mattress. In such applications where it is desirable to locate a pump remotely, it may also be desirable to wrap the motor in a sound insulative material or otherwise house the pump to reduce noise.

Barrier 540 may be a molded plastic part suitably coupled to inflatable device 500 to limit air flow to the ambient surroundings as described above. In some embodiments, compartment 545 has a profile that is flush with or within the profile of bladders (illustrated by dashed line 552). In such embodiments, it is possible the fluid compartment containing the valve and perhaps electromechanical device fit within a bed frame with which the mattress is used. Compartment 545 may have any suitable shape.

In some embodiments, the fluid controller 510 may include a control panel 560 that may be located, for example, on a bed frame, thereby allowing a user easy access to the control panel. Using the control panel, a user may control inflation/deflation of the inflatable bladder, and thus the firmness of the mattress.

It is to be appreciated that in embodiments in which the valve is coupled to the inflatable bladder and forms a seals with the inflatable bladder to maintain fluid in inflatable device 500 as described above, pump 550 need not form an airtight seal to maintain fluid in inflatable device 500; and in embodiments in which the pump 550 is connected to the compartment by a hose, the hose need not be airtight. It is further to be appreciated that because of the reduced demands on the air tight characteristics of the pump and/or hose the use of a pump providing higher air volumes is facilitated and, as such the air mattress can be filled at a higher rate. For example, a mattress may be filled in less than one minute. One benefit of filling at a high rate is that an individual lying on the inflatable device can perceive the change in support and select a level of filling according to feel (i.e., tactily).

Figure 5B:
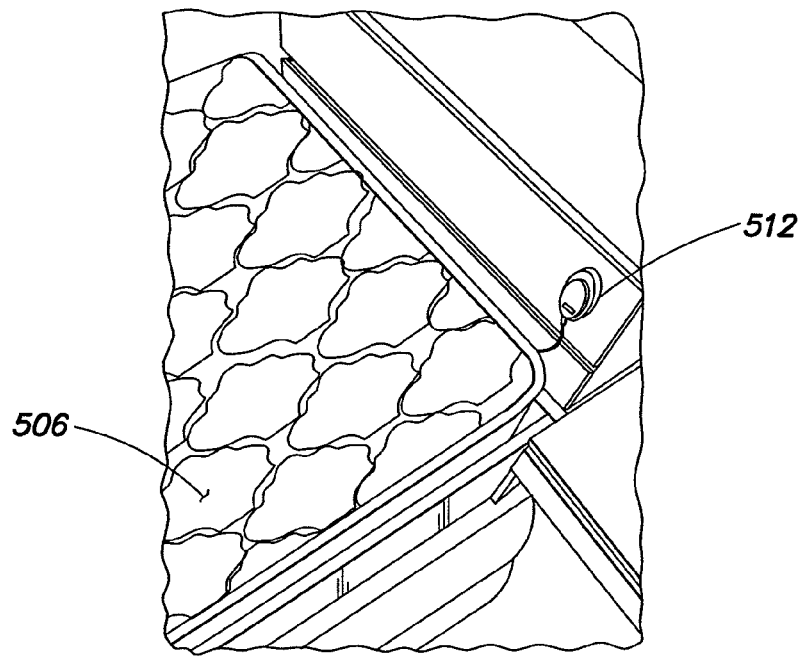
Figure 5C:
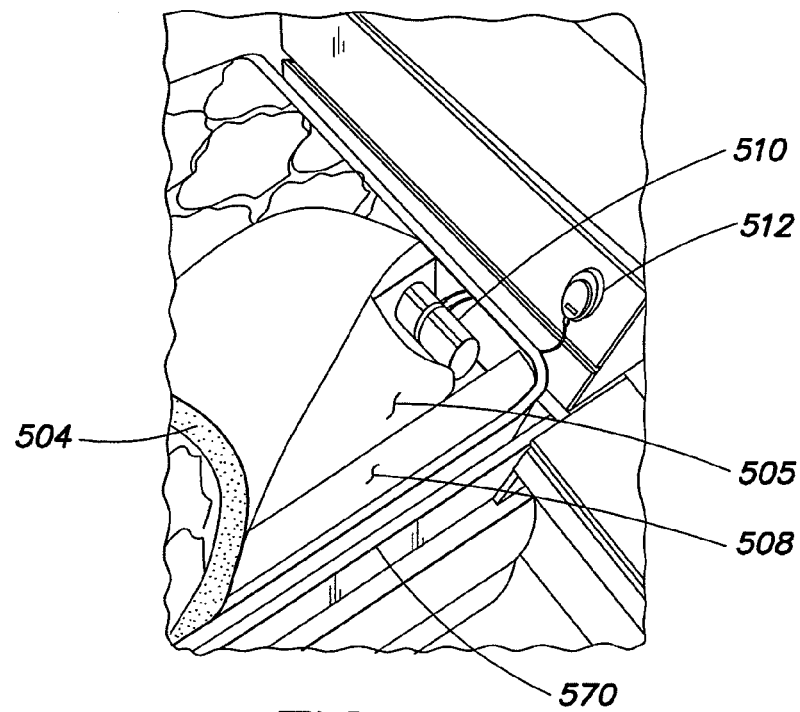

FIGS. 5B and 5C are schematic illustrations of an exemplary embodiment of a mattress and fluid controller as described above with reference to FIG. 5A. In the illustrated embodiment, mattress 500 comprises additional materials that at least partially surround the inflatable bladder 505 (collectively referred to as supplemental material). Supplemental material may be materials common to everyday mattresses, such as a stitched or quilted surface layer 506 of a natural or synthetic fabric. The mattress may also include at least one innerspring, as well as any or all of foam, cotton, down, or other natural or synthetic fibers for cushioning, support and comfort, which may be located at or near the mattress top surface or side walls. The mattress may also include a top central surface, located above the inflatable bladder 505, for sleeping and/or reclining. There may also be an intermediary layer 504 of material above the bladder and beneath the surface layer of the mattress. The intermediary layer may comprise foam, cotton, down or other natural or synthetic fibers, and the mattress may be so constructed to allow interchangeability of the intermediary layer to provide users with additional sleep surface options. Accordingly, a user of the mattress can select the feel of the mattress by selecting the intermediate layer. Mattress 500 usually additionally includes a bottom surface and side walls that support the at least one inflatable bladder 505, the fluid controller 510 and additional materials.

According to the illustrated embodiment of the invention, mattress 500 comprises a fluid controller 510 coupled to an inflatable bladder 505, wherein the fluid controller 510 is at least partially supported by an element of the mattress structure. For example, referring to FIG. 5C, the mattress includes a perimeter structure 508 surrounding the at least one inflatable bladder, and the fluid controller is located within the perimeter structure, as shown. Optionally, fluid controller 510 may be integrated into the mattress structure within a foam or other mattress filling material, such that it is not a free-standing, separate component.

As shown in FIGS. 5B and 5C, the mattress structure may further include a frame 570 that supports the mattress, for example, supporting the mattress above the floor. In one embodiment (not illustrated), the frame may also support one or more components of fluid controller 510. For example, the one or more components of the fluid controller may be embedded within or attached to the frame.

In some embodiments, for example, in dual occupancy mattresses (such as queen or king sizes), the mattress may include two inflatable bladders separated by a separating element. In this case, each inflatable bladder may include its own fluid controller, or may be linked to a common fluid controller as discussed in greater detail below with reference to FIGS. 6A and 6B. In such embodiments, each fluid controller may be coupled to a separate or common control panels 612 for control by a user.

Figure 6A:
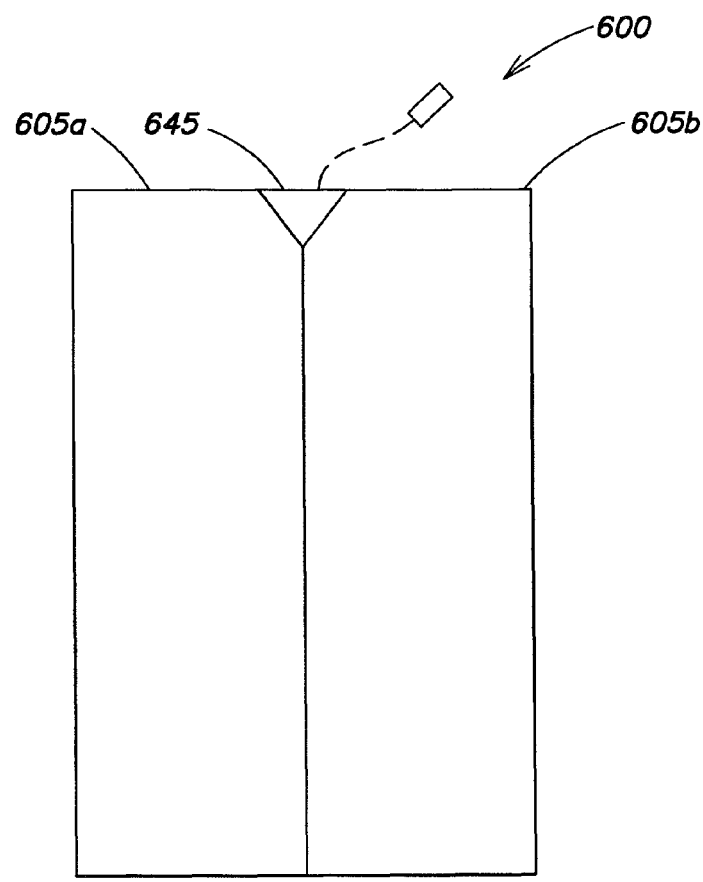
FIGS. 6A-6C are illustrations of exemplary embodiments of a dual bladder mattress in which a first inflatable bladder and a second inflatable bladder are fluidly coupled to a common fluid controller.
Figure 6B:
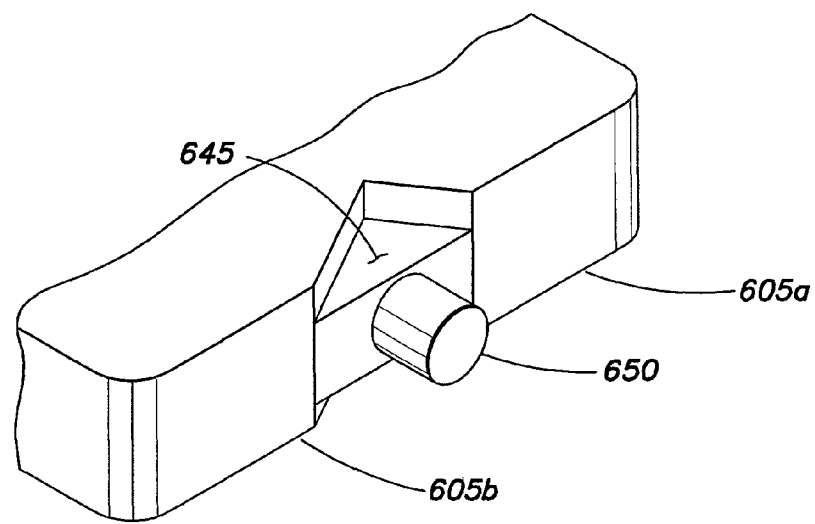

FIG. 6A is a schematic illustration of a dual mattress embodiment 600 of aspects of the present the invention in which a first inflatable bladder 605A and a second inflatable bladder 605B are fluidly coupled to a common fluid controller. In the illustrated embodiment, portions of the fluid controller are maintained with a V-shaped compartment 645. FIG. 6B is perspective view of dual mattress 600 having a V-shaped compartment 645 and a pump 650.

Figure 6C:
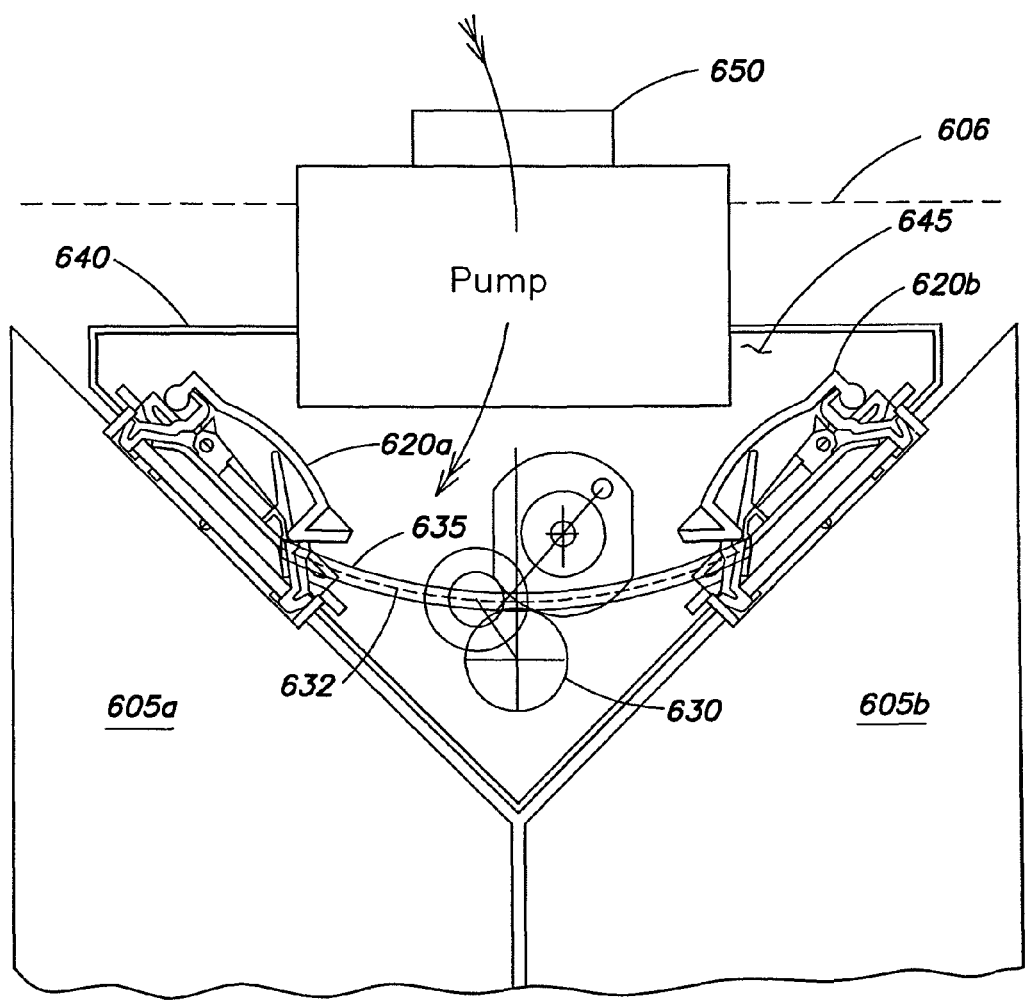

FIG. 6C is a schematic illustration of the details of an exemplary fluid controller for use with a dual mattress embodiment of the invention. Valves 620a and 620b (e.g., self sealing valves) are connected to the right side mattress 605b and the left side mattress 605a, respectively. Barrier 640 is substantially within a profile 606 of the mattress. In the illustrated embodiment, pump 650 is illustrated as connected to the compartment. However, the pump may be coupled to the compartment through a hose as described above.

Barrier 640 may be connected to valves 620a and 620b, as illustrated to form compartment 645. In such an embodiment, the compartment is coupled to the inflatable bladders 605a and 605b through the valves. Alternatively, the barrier may be connected to the bladder to form compartment 645. In some embodiments, the barrier may be connected to the bladder such that the bladder forms one or more sides of the compartment.

In the illustrated embodiment, a single electromechanical device 630 may be operated to bias actuator arm 635 to open one of valves 620a and 620b while the pump 650 is operated to fill a corresponding mattress 605a, 605b. As described above the arm may displace both the valve cover and the diaphragm or the may only displace the cover, such that air pressure from the pump displaces the diaphragm. Electromechanical device 630 typically operates in three positions: displaced to the left to open valve 620a; displaced to the right to open valve 620b; and in a neutral position, in which neither valve is open. In the illustrated embodiment, arm 635 has an arcurate shape and electromechanical device has a gear train that moves the in an accurate path (illustrated by dashed line 632) formed by the arm. However, arm 635 may be made of any suitable shape (e.g., straight) and moved in a appropriate manner to open valves 620a, 620b.

Figure 7A:
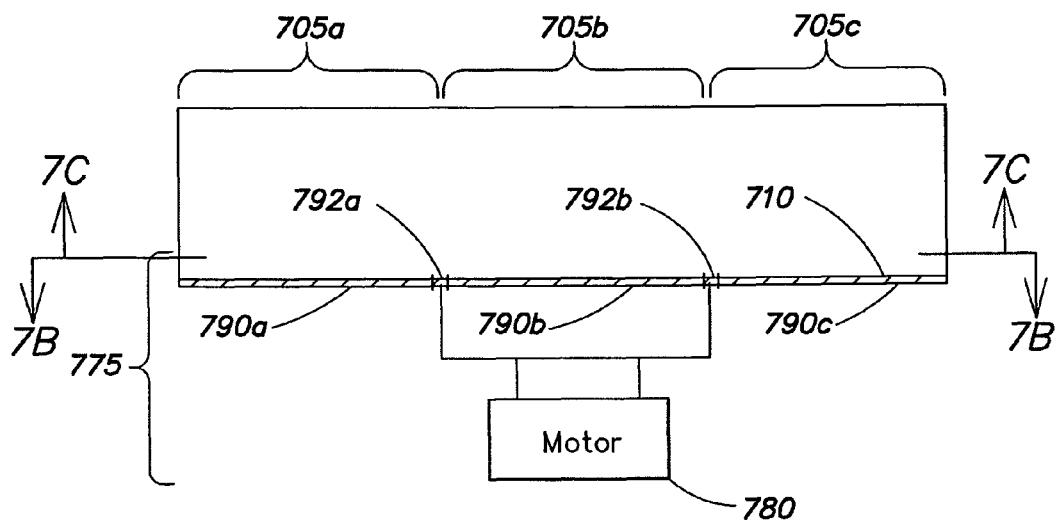
FIGS. 7A-7C are illustrations of an exemplary embodiment of a mattress and related structure.
Figure 7B:
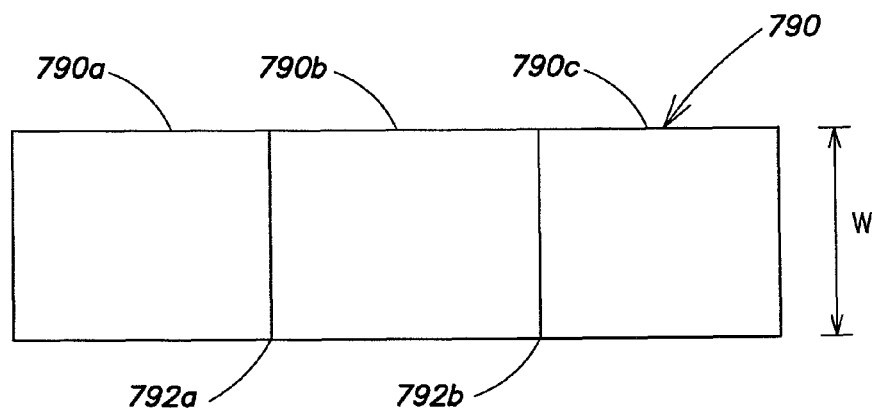
Figure 7C:
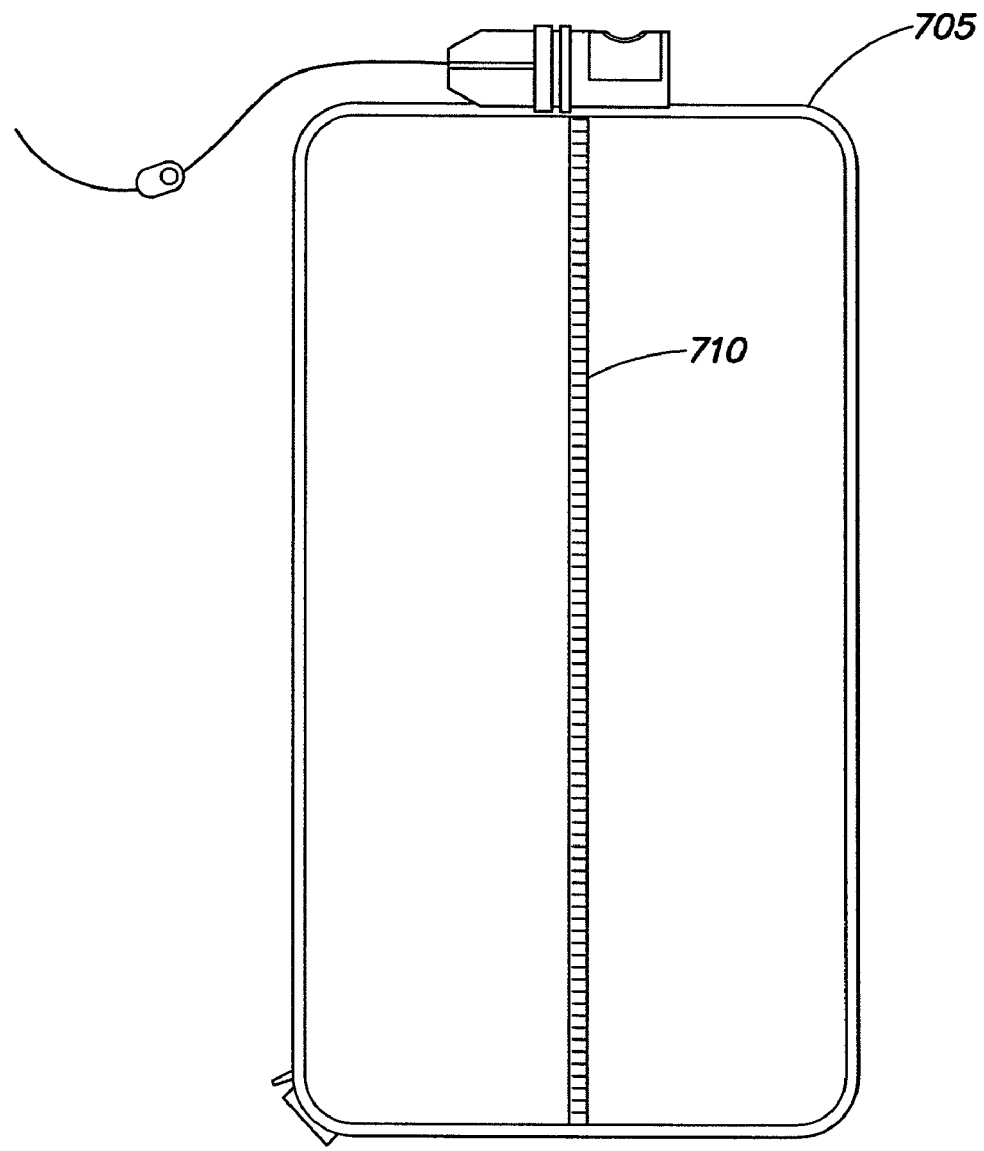

As illustrated in FIGS. 7A-7C, in some embodiments, a mattress 705 may be accompanied by additional features, for example, a heater 710 and/or an articulation apparatus 775. The heater may be any suitable heater. For example, in an air filled mattress, heater 710 may be located along the entire bottom of mattress 705. In some embodiments, the heater is disposed uniformly along the length or width of the mattress. The term "uniformly" means covering completely, or evenly spaced along a dimension of the mattress. Alternatively, due to heat transfer properties of air, a heater may be located in just a portion of the bottom of the mattress (e.g., corner of the mattress). FIG. 7C illustrates an embodiment of a mattress having a pump 750 and a heater 710 comprising an adhesive, resistive strip that runs along the length of the mattress. Electricity is applied to strip to generate heat. The resistive strip provides heat to a central portion of the mattress, and heat dispersive characteristics of air disperse the heat substantially uniformly in the mattress. Although a single strip is illustrated, a plurality of strips may be used, and the one or more strips may be aligned in any suitable direction along the mattress.

Referring again to FIG. 7A, articulation apparatus 775 may be any suitable structure capable of raising or lowering a portion of the mattress. In the illustrated embodiment, the articulation device comprises a motor 780 and mattress support 790. The motor may be any suitable motor capable of raising either one or both of a head region 705a and a leg region 705c of the mattress, relative to a torso region 705b.

Mattress support 790 may be any suitable structure capable of manipulating a mattress, as powered by motor 780. As illustrated in FIG. 7B, mattress support 790 may be a substantially continuous structure capable of bending at selected locations 792a, 792b or having suitable joints (e.g., hinges) at the selected locations. The term "substantially continuous" means capable of keeping the mattress from falling in into a gap so as to form a non-supportive region of the mattress. For example, a substantially continuous structure may comprise a 1) series of bars or bands, each extending across the width W, the bands being suitable spaced to avoid non-supportive regions, or 2) a continuous flat slab, possibly having through holes for providing electricity to a fluid controller.

It is to be appreciated that raising or lowering of a region of the mattress may be accompanied with deflation of the mattress 705 to help assure that the mattress remains in contact with mattress support 790 and bends more continuously and accurately. The mattress may be re-inflated as the mattress is made more flat. The deflation/re-inflation may be controlled by a human being or may be automatically coordinated with articulation of the mattress by, for example, measuring the pressure in mattress during articulation. Optionally, a controller may be included to achieve automatic articulation.

Figure 8A:
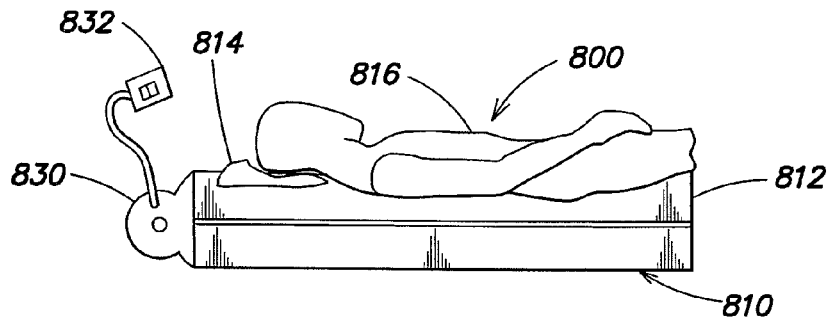
FIGS. 8A-8D are illustrations of an exemplary embodiment of an inflatable device which includes a multi-positional body support device.
Figure 8B:
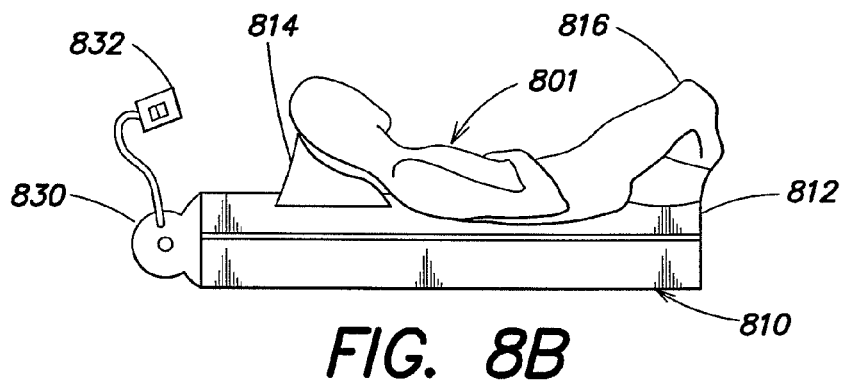
Figure 8C:
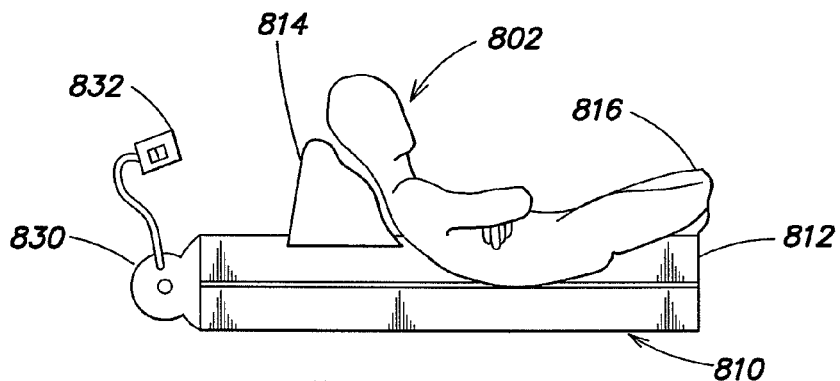

Referring now to FIGS. 8A-8C, according to another aspect of the invention, an inflatable device 810 includes a multi-positional body support device including a first inflatable bladder 812 and a second inflatable bladder 814. Bladder 812 and bladder 814 are disposed adjacent to one another. In some embodiments, they may be coupled together, and in some embodiments they are connected together, such that they share a common wall.

In the illustrated embodiment, the inflatable device 810 includes a first inflatable bladder 812 having a corresponding first level of inflation and a second inflatable bladder 814 having a corresponding first level of inflation. First bladder 812 and second bladder 814, each in their corresponding first level of inflation combine to form a first configuration of inflatable device 810 for use with a body in a first body position, for example, prone 800. Subsequently, first bladder and second bladder may be inflated or deflated to achieve corresponding second levels of inflation. First bladder 812 and second bladder 814, each in their corresponding second levels of inflation combine to form a second configuration of inflatable device 810 corresponding to a second body position, for example, one of reclining 801 or sitting 802, of body 816 to be supported on device 810.

The first and second positions of a body to be supported on device 810 may be any of a number of positions, and the corresponding levels of inflation of bladder 812 and bladder 814 may be selected in order to provide the desired positions. For example, the first position may correspond to a fully prone position 800, and, as illustrated in FIG. 8A, the first level of inflation may comprise substantially complete inflation of bladder 812 and complete deflation of bladder 814. It should be appreciated that with regard to compressible fluids, such as gases, the term "complete inflation" is a relative term and refers to the maximum level of inflation typically used for a particular bladder. Higher levels of inflation of bladder 812 will typically be used to provide a prone position 800 when inflatable device 810 is constructed as a mattress, because higher levels of inflation will hold the body 816 relatively straight, not permitting portions of body 816 to sink into bladder 812, thus maintaining prone position 800.

Where first position 800 is a prone position, second position 801 may be a reclining position 801 or a sitting position 802, corresponding to a second level of inflation of bladder 812. Typically, the second level of inflation of bladder 812 may be lower than the first level of inflation, allowing body 816 to sink into bladder 812, and assuming a reclining position 801 or sitting position 802. Where the second position of body 816 is defined as reclining position 801, the third position of body 816 may be defined as sitting 802, and may correspond to a third level of inflation of bladder 812. The third level of inflation of bladder 812 may be less than the first and second levels of inflation of bladder 812, such that body 816 supported on implantable device 810 is allowed to sink further into bladder 812, and into sitting position 802. It should be understood that conventional definitions of prone, reclining, and sitting are intended here and that these terms are relative. For example, sitting can include some degree of recline, as illustrated in FIG. 8C. Accordingly, it should be appreciated that sitting and reclining may overlap to some degree, with what is shown as sitting in FIG. 8C being a reclining position compared to a more upright sitting position.

It is to be appreciated that in each of the positions illustrated in FIGS. 8A-8C, second bladder 814 supplements bladder 812 to provide a desired position of a body supported on an inflatable device. For example, as illustrated in FIGS. 8A-8C, second bladder 814 may comprise a pillow. Where second bladder 814 comprises a pillow, it may be a suitable pillow to support a user's head, and/or back and shoulders. It should be appreciated that the level of inflation of second bladder 814 need not match the level of inflation of first bladder 812, and that in some embodiments, they may be inversely proportional. For example, as shown in FIGS. 8A-8C, where first bladder 812 is part of an inflatable device comprising a mattress, and second bladder 814 comprises a pillow, by decreasing the level of inflation of the first bladder while increasing the level of inflation of the second bladder, it may be possible to support the head and shoulders of the body on the inflatable device, while allowing the lower portion of the body to sink into bladder 812, moving the position of the body from prone to reclining. Further inflation of bladder 814 coupled with further deflation of bladder 812 may move the position of the body from reclining to sitting.

Figure 8D:
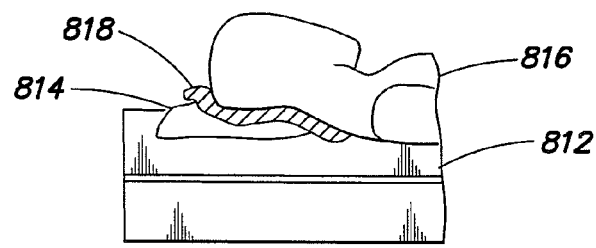

While inflatable devices as described above may provide the advantage of multi-positionability, other features that are desirable in a body support may be lacking in an inflatable bladder. For example, the usually fluid impermeable nature of inflatable bladders may limit the ability of the body support to adequately allow for circulation of air and moisture to or from a person positioned on the bladder. Furthermore, the surface of an inflatable bladder may not provide a desired "feel" to a body support. Finally, where firmer inflatable devices are used, the surface area of contact between the inflatable device and a supported body may be reduced. Conventional comfort layers, such as quilted materials, may be too thin, and otherwise not designed to fully address these issues. Accordingly, in one embodiment, illustrated in FIG. 8D, a comfort layer includes a conventional cushion 818. The conventional cushion may be at least 1 centimeter thick and may cover at least three quarters of one side of the bladder. In certain embodiments, the conventional cushion is at least 2 centimeters thick and covers substantially all of one side of the bladder. In still other embodiments, the conventional cushion is as much as 10 centimeters thick and covers substantially all of the bladder. It should be appreciated that these embodiments are intended by way of example only and may be intermingled, such as in the case of a 1 centimeter thick bladder covering substantially all of a bladder.

Conventional cushion 818 may be constructed in any manner and using any materials that allow cushion 818 to perform its desired support and comfort functions. For example, cushion 818 may be squared or rounded and may vary in overall thickness, as described above, or from location to location, such as in the case of "egg crate" foam. Cushion 818 may be constructed from conventional materials, such as down, synthetic or natural fibers, or foam. Cushion 818 may be constructed to remain in position relative to the blabber. For example, cushion 818 may be coupled to the bladder. Depending on the embodiment, cushion 818 may be glued, buttoned, hook and loop fastened, zipped, or the like, onto the bladder.

Figure 9A:
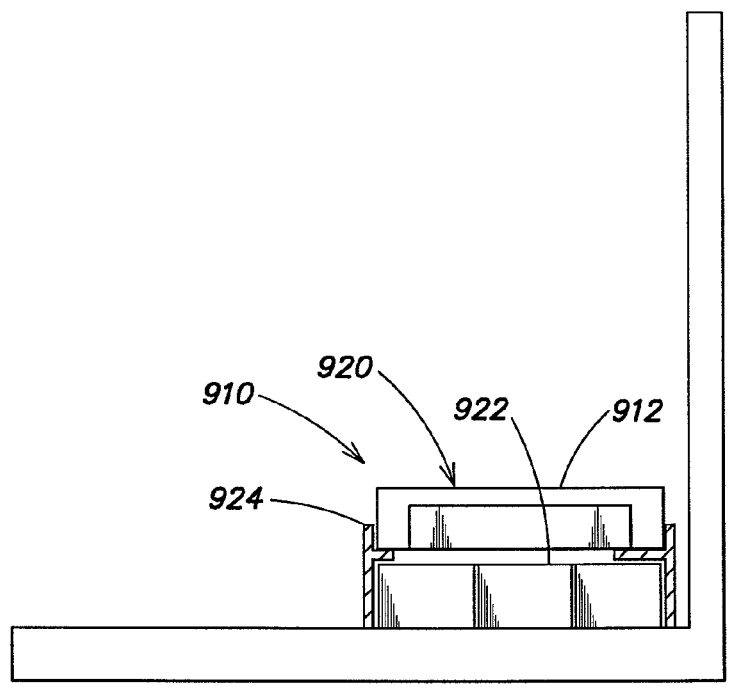
FIGS. 9A-9B are schematic illustrations of embodiments of an inflatable device comprising a storage compartment.
Figure 9B:
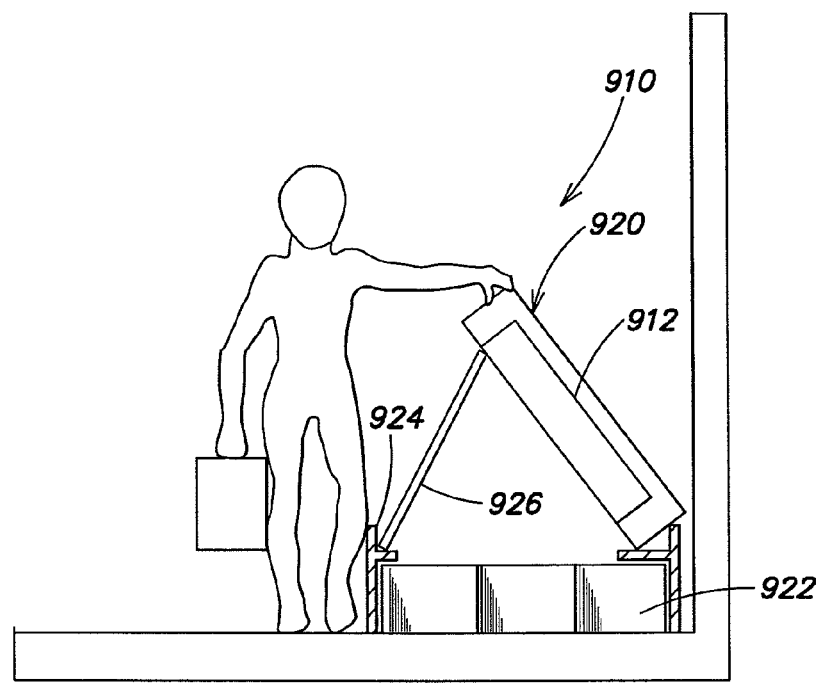

FIGS. 9A and 9B are schematic illustrations of another aspect of the present invention which takes advantage of the typically light weight of inflatable devices to increase their functionality. In one example of this embodiment, the present invention is directed to an article of furniture including a user support 920 having an inflatable bladder 912 and a base 924 having a storage compartment 922 and positioned beneath user support 920. In this embodiment, user support 920 is movable to allow access to storage compartment 922. Accordingly, it can be seen how this embodiment of the present invention takes advantage of the lightweight nature of gas-filled inflatable devices. Because a gas-filled inflatable device may be relatively lightweight, it may be easily moved to expose storage space beneath the user support.

User support 920 may be constructed in any manner and using any materials so long as it meets support requirements and is sufficiently lightweight for a particular application. Similarly, base 924 may be constructed in any manner and using any materials that adequately support user support 920. Storage compartment 922 may be constructed in any materials and in any manner that allow storage compartment 922 to perform a desired storage function and allows base 924 to support user support 920. Shape of storage compartment 922 may be partially dictated by the shape of base 924.

FIGS. 9A and 9B illustrate an article of furniture according to this embodiment of the invention, arranged as a bed. In this particular embodiment, user support 920 comprises an air mattress, and base 924 comprises a bed frame. The air mattress may be a conventional air mattress having dimensions compatible with standard bedding sizes (e.g. twin, full, queen, king). The bed frame may be a generally hollow box, or the like, the inside of which is adapted to serve as compartment 922. The bed frame may further include a support or supports, such as a net, beams, or a cover, to inhibit the air mattress from collapsing into storage compartment 922. Storage compartment 922 may be divided in various ways into smaller sub-compartments. In another embodiment, the present invention may be configured as a couch or chair. In such an embodiment, user support 920 may comprise a support portion of a chair or couch, such as the cushioned upper portions of the chair or couch, and the base may comprise the lower portion of the chair or couch.

Base 924 may include structure to facilitate movement of user support 920 off of storage compartment 922. For example, base 924 may be adapted to facilitate sliding, rotating or elevating of user support 920 off of base 924. Where it is desired for the user support to be slidable, base 924 may be adapted to have low friction with user support 920. In certain such embodiments, guides, tracks, rails, or the like, may be used to facilitate sliding movement of use support 920.

In one embodiment including a user support and base, user support 920 is releasably connected to base 924, such that user support 920 may be moved in order to provide access to storage compartment 922. For example, user support 920 may be hingedly connected to base 924. Where user support 920 is hingedly connected to base 924, the hinge may comprise any conventional hinge known in the art, including a typical metal hinge, or a piece of flexible material. Inflatable device 910 may include a lock 926 sized and adapted to hold user support 920 such that storage compartment 922 is accessible. For example, lock 926 may be sized and adapted to hold user support 920 in a raised position. Lock 926 may be any device capable of supporting user support 920 in the raised position. For example, lock 926 may be associated with a hinge positioned between user support 920 and base 924 or may be a device which props up user support 920, preventing it from closing, as illustrated in FIG. 9B. In some embodiment, including a storage compartment may be used in combination with an articulation device as described above with reference to FIGS. 7A-7B

Figure 10A:
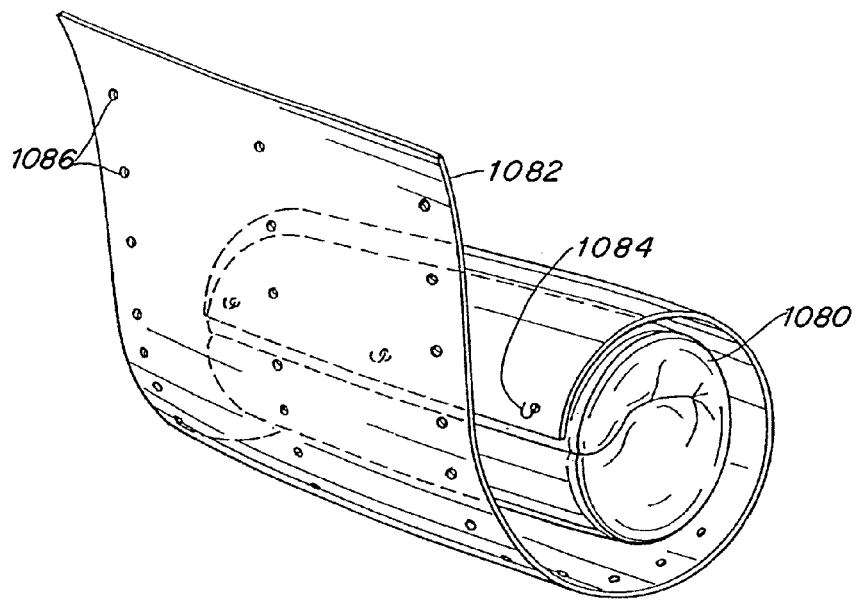
FIGS. 10-10C, illustrate embodiments of an inflatable device including an inflatable bladder combined with a membrane.
Figure 10B:
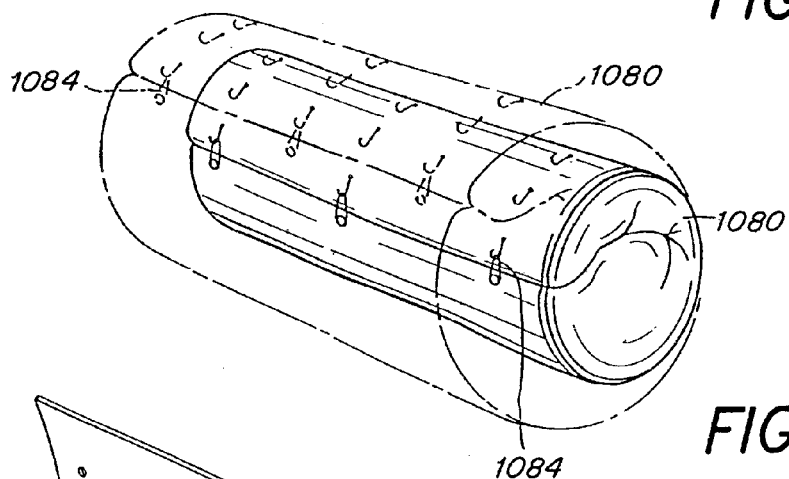
Figure 10C:
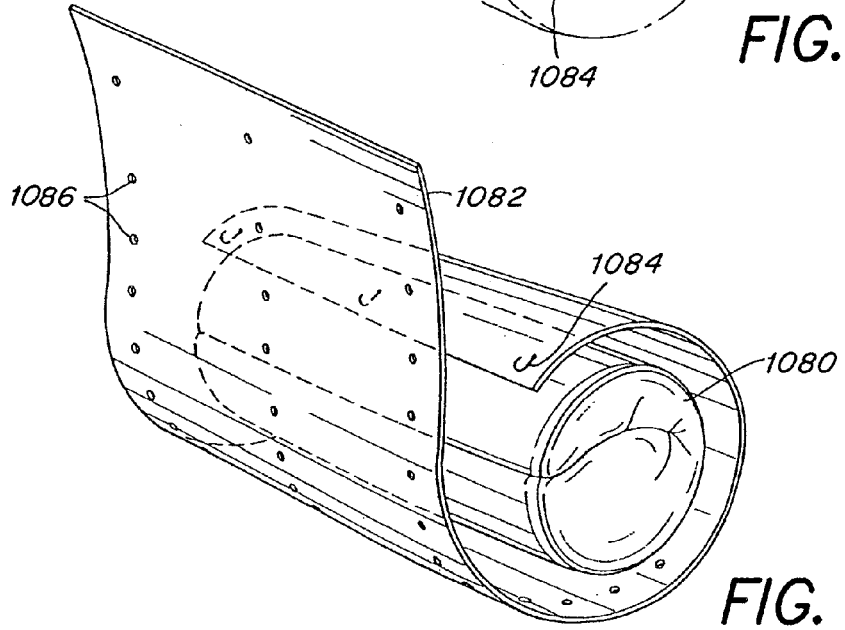

According to another aspect of the invention, a configurable inflatable device may include one or more inflatable bladders in combination with a shape-defining membrane/covering layer. Referring to FIGS. 10A-C, there is illustrated one embodiment of an inflatable device that may be used as a bolster-type pillow. In this example, an inflatable bladder 1080 may be combined with a membrane/covering layer 1082. As shown in FIG. 10A, the membrane/covering layer 1082 may be a planar membrane that may be rectangular and may be wrapped around the inflatable bladder 1080 such that the overall structure may have a cylindrical tubular shape. However, it is to be appreciated that the bladder may not necessarily be cylindrical, and may be combined with the membrane/covering layer so as to form a structure having a shape that is not cylindrical, as will be discussed in more detail below. Furthermore, the membrane/covering layer 1082 need not be rectangular, but may have another shape conducive to an overall desired shape of the structure.

In one example, the bladder 1080 may be formed from a material that is flexible, and possibly somewhat elastic, while being substantially impermeable to fluids such as water or air. This flexibility of the bladder material, combined with the fact that the degree of inflation of the bladder (amount of fluid injected into the bladder) may be varied, may result in the bladder being highly malleable and configurable. Furthermore, the bladder may also be used in combination with the configurable, attachable membrane/covering layer 1082, which allows the shape of the inflatable structure to be further controlled. For example, the configurable, attachable membrane may restrict inflation of certain parts of the inflatable bladder, thereby altering the shape of the bladder when inflated. In some embodiments, folding or otherwise manipulating or controlling shape is used in addition to controlling the degree of inflation within the bladder so as to accommodate different support requirements. In such embodiments, folding may or may not be accompanied with the use of a membrane. In one example, the membrane/covering layer 1082 may be provided with fasteners 1084 that may be used to fasten the membrane around the inflatable bladder 1080, as illustrated. The fasteners may be hook and loop fasteners, such as, for example, Velcro® hook and loop fasteners, or larger hook and loop fasteners as illustrated, or may be another type of fastener, for example, buttons, snaps, adjustable straps, or the button latch fastener discussed above. In one example, illustrated in FIGS. 10A and 10C, the membrane/covering layer 1082 may be provided with a plurality of holes 1086 and a row of hook fasteners 1084, such that a diameter of the structure may be controlled by hooking the fasteners 1084 into an appropriate row of holes 1086. Alternatively, in some embodiments, two or more fasteners 1084 may be connected to the inflatable bladder 1080 thus allowing a portion of the bladder to attach to another portion of the bladder, thus controlling a shape of the bladder, with or without attachment of the membrane/covering layer, as illustrated in FIG. 10B. In some embodiment, inflatable bladder 1080 may be provided with a rigid or flexible rib, in addition to or instead of other members used for configurability, to add configurability or otherwise constrain the volume of the bladder. The rib may be internal or external to the bladder. Such ribs may be used with any of inflatable bladders as discussed herein.

In the example of a bolster-type pillow, the inflatable bladder may be substantially contained within the membrane/covering layer, which may be fastened so as to provide a pillow with a certain desired diameter. Once a desired diameter of the pillow has been selected, the bladder may be inflated as much as allowed by the constraining membrane/covering layer and/or fasteners, i.e., to completely fill the set diameter, to provide firm support to the user. Alternatively, the bladder may be less inflated so as not to completely fill the volume defined by the set diameter, should the user desire the device to be less firm or more malleable. For example, the diameter of the bolster pillow may be controllable from approximately 10" (25.4 cm) when fully inflated to approximately 3" (7.62 cm) when only partially inflated. Controlling the diameter of the pillow using adjustable fasteners has the advantage of maintaining the substantially cylindrical shape of the pillow even when the bladder is not fully inflated, to still provide support to the user. Although the above features of the inflatable device have been described in terms of a controllable diameter with reference to a bolster pillow, it is to be appreciated that the device is not limited to this structure, and the principles here described may be applied to other structures having non-cylindrical shapes. It is to be appreciated that, although the fasteners above were illustrated as connected to a covering layer and only coupled to the bladder, in some embodiments according to the present invention, the fasteners used for configuring a bladder may be directly connected to the bladder.

According to another example, the membrane/covering layer may have an envelope-type structure that encompasses at least a portion of the inflatable bladder. The malleability and reconfigurability of the inflatable bladder combined with adjustment means such as the fasteners, may provide a pillow, or other device, the size and shape of which may be easily modified as desired. The inflatable bladder may be provided with a valve to allow for easy inflation and deflation. In situations where additional structure may be required or desirable, the attachment or adjustment means may allow a rigid member to be combined with the bladder to provide the additional structure.

Figure 11A:
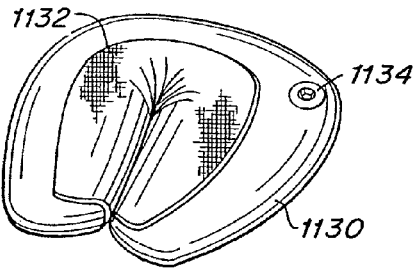
FIGS. 11A-11D, illustrate exemplary embodiments of a configurable inflatable device comprising an inflatable bladder in combination with an outer membrane.
Figure 11B:
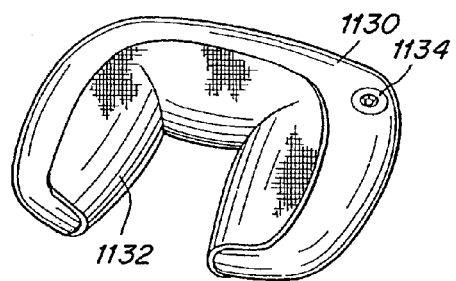
Figure 11C:
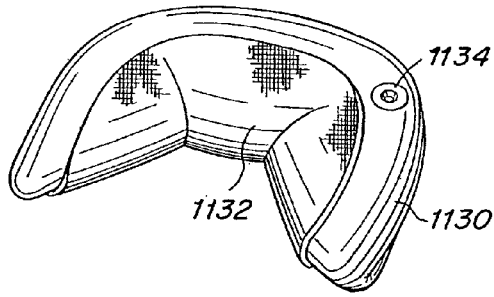
Figure 11D:
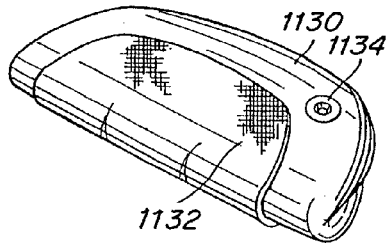

Referring to FIGS. 11A-D, there is illustrated examples of another embodiment of a configurable inflatable device comprising an inflatable bladder 1130 in combination with a partial outer membrane 1132. This type of inflatable device may be referred to as a pillow, although it may serve other functions and may be used in other applications, not only as a pillow. The inflatable bladder 1130 comprises a valve 1134 for inflation and deflation. The partial outer membrane 1132 may be provided in the form of an attachable collar and the shape of the pillow, or cushion, may be controlled by variations in how the collar and the inflatable bladder 1130 are attached, and the level of inflation. The pillow structure may provide a variety of comfort shape options, for example, a circle as shown in FIG. 11A, a "U" as shown in FIG. 11B, a crescent as illustrated in FIG. 11C, or a substantially straight tube as illustrated in FIG. 11D. In one example, the partial outer membrane 1132 may be a quilted or padded comfort layer, and/or may be include a comfort-enhancing fabric.

Figure 12A:
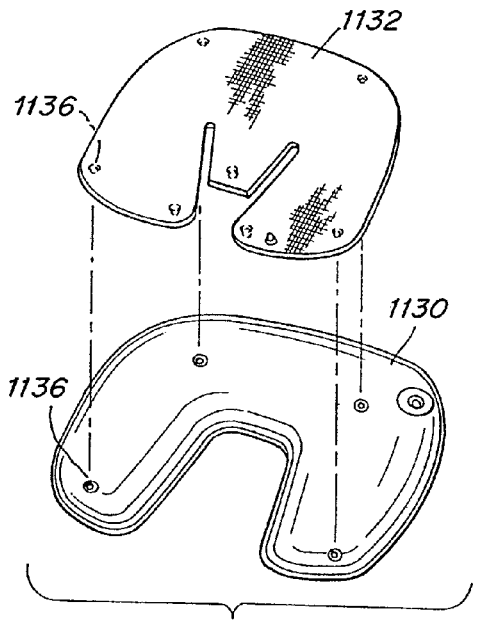
FIGS. 12A-12B, illustrate exemplary embodiments including inflatable bladders attached to an outer membrane using fasteners.
Figure 12B:
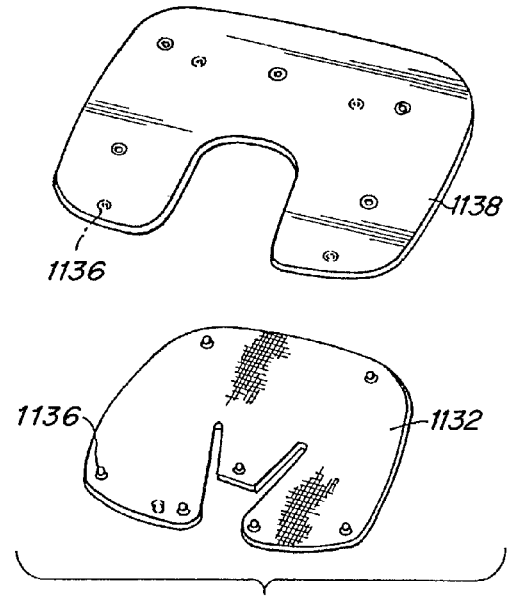
Figure 13A:
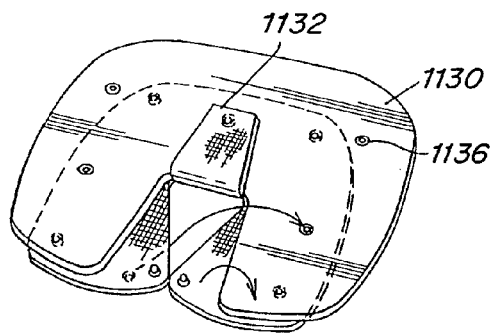
FIGS. 13A-13H, illustrate further exemplary embodiments in which inflatable bladders are attached to an outer membrane.
Figure 13B:
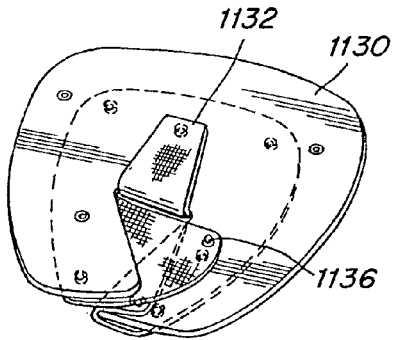
Figure 13C:
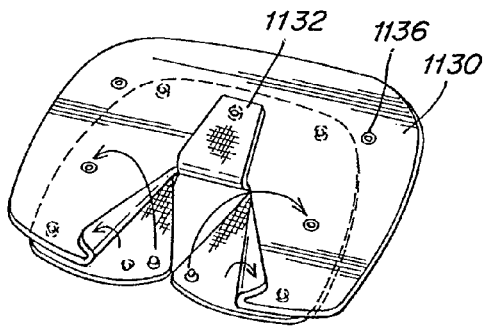
Figure 13D:
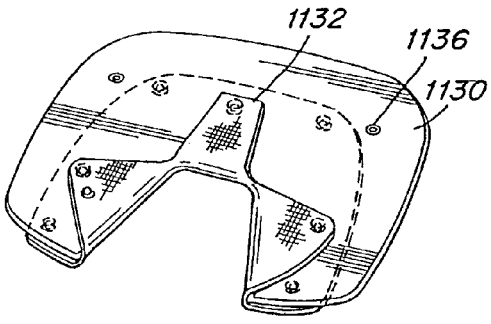
Figure 13E:
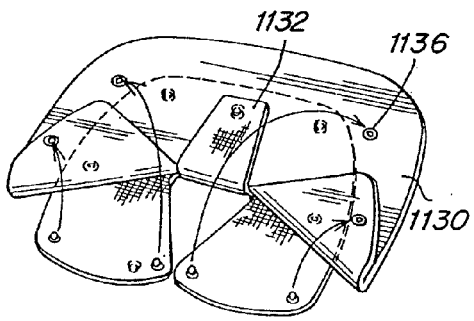
Figure 13F:
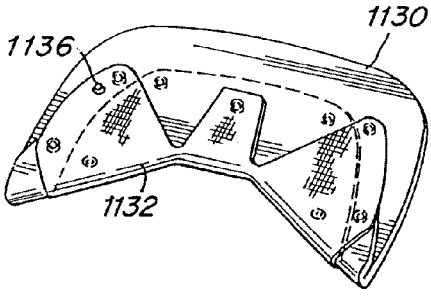
Figure 13G:
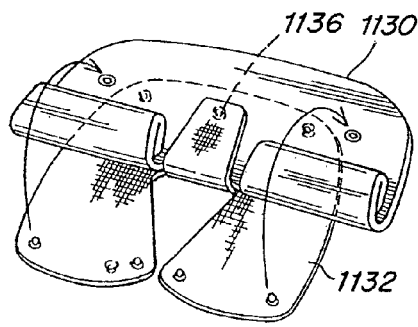
Figure 13H:
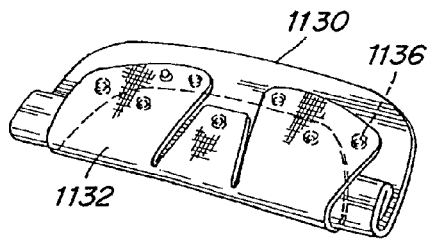

Referring to FIGS. 12A and 12B, the inflatable bladder 1130 may be attached to the partial outer membrane 1132 using fasteners 1136. In one example, fasteners 1136 may be provided on both the inflatable bladder 1130 and on the partial outer membrane 1132, such that the partial outer membrane 1132 may be attached to the inflatable bladder 1130. The fasteners may be snap fasteners as illustrated. For example, the partial outer membrane 1132 may include the protruding portion of the snap fastener 136, as illustrated in FIG. 12A, and the inflatable bladder 1130 may include the corresponding mating portion. Alternatively, the fasteners may be provided with the protruding portion attached to the inflatable bladder. The fasteners may also be another type of fastener, such as, for example, button fasteners, hook and loop fasteners, etc. By fastening the partial outer membrane to the inflatable bladder in various ways, using some or all of the fasteners provided, the structure may be made to take a desired shape, such as the shapes illustrated in FIGS. 11A-B. Alternatively, a second partial outer membrane 1138 may be provided, as illustrated in FIG. 12B, and the structure may be formed by attaching the first partial outer membrane 1132 to the second partial outer membrane 1138, by means of fasteners 1136, with the inflatable bladder placed between the two membranes. According to another example, the outer membrane may removably, substantially completely surround the inflatable bladder, and may include an opening to provide direct access to the valve.

Referring to FIGS. 13A-H, there are illustrated several examples of attaching combinations of the inflatable bladder 1130 and the partial outer membrane 1132. The partial outer membrane 1132 may, by its attachment, constrain the inflatable bladder 1130 upon inflation and may cause it to assume a shape other than the shape the inflated bladder 1130 alone would naturally assume upon inflation. The variability in the manner in which the partial outer membrane may be attached to the inflatable bladder provides a device that is highly configurable and allows a single inflatable bladder of one shape to be used in a variety of applications.

Figure 14:
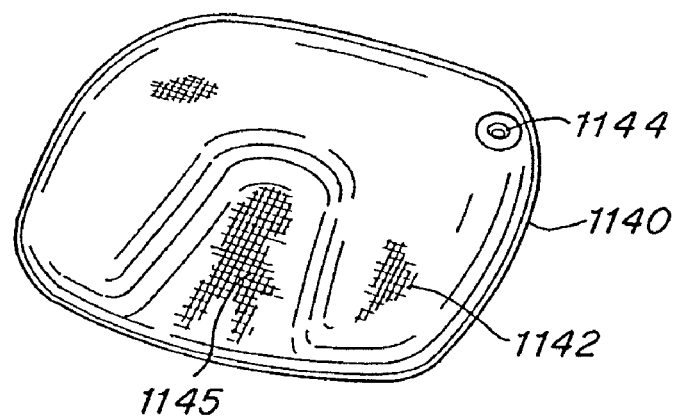
FIGS. 14-15 illustrate additional embodiments of a configurable inflatable device including an inflatable bladder having a valve for inflation and deflation which may be enclosed, or partially enclosed, within a covering layer.

According to yet another embodiment of a configurable inflatable device, an inflatable bladder 1140, having a valve 1144 for inflation and deflation, may be enclosed, or partially enclosed, within a covering layer 1142, as illustrated in FIG. 14. The covering layer 1142 may be made of a flexible material such as rubber, a cotton mesh, or any other material used in the art, and may have a volume different from that of the inflatable bladder 1140. For example, the covering layer 1142 may be sized and configured so as to constrain the size and/or shape of the inflatable bladder to provide a resulting inflatable device structure that is different than that of the bladder itself. With this arrangement, the bladder and covering layer in combination provide an inflatable device having a different volume and shape than that exhibited by the bladder itself. In addition, it is to be understood that the flexibility of the inflatable bladder material, and the degree of variability provided by the ability to adjust the level of inflation of the bladder, provide an inflatable device having a plurality of levels of comfort. Inflation of the inflatable bladder 1140 within the covering layer 1142 may also provide a comfort and/or support surface that may not be provided by the inflatable bladder 1140 alone. For example, a U-shaped inflatable bladder may be contained within an approximately rectangular covering layer, as illustrated in FIG. 14, thereby providing a pillow having a support/comfort area 1145 that includes the covering layer, but where there is no portion of the inflatable bladder present. Thus, this structure may provide different comfort and/or support features from those that the U-shaped inflatable bladder may provide on its own, or with a shape-conforming covering layer.

Figure 15:
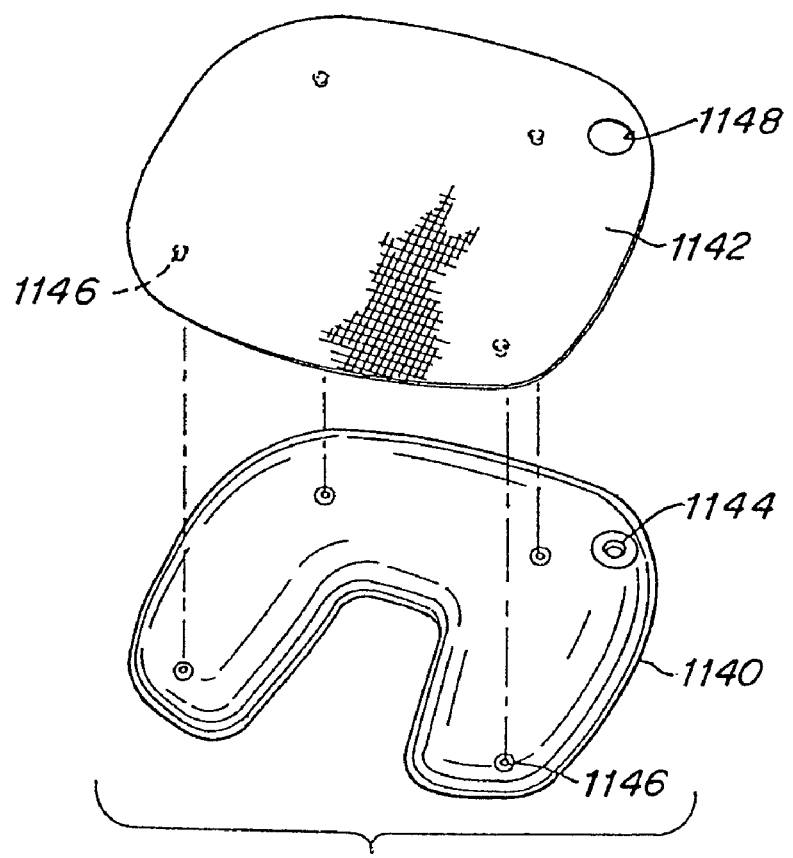

It is to be appreciated that FIGS. 14 and 15 illustrate examples of an inflatable bladder in combination with a covering layer, but that many different inflatable devices having a number of possible comfort surfaces may be obtained through the combination of various bladder shapes and volumes with covering layers of different shapes, sizes, and materials. For example, referring to FIG. 15, the covering layer 1142 may not completely enclose the inflatable bladder 1140, but may be provided with fasteners 1146 that may be used to attach the covering layer 1142 to a portion of the inflatable bladder 1140. The fasteners may be, for example, hook and loop fasteners, adjustable straps, buttons, snap fasteners, or another type of fastener known to those of skill in the art. According to another example, the covering layer may be provided in the form of a bag, for example, a drawstring bag, that may surround the inflatable bladder. In certain examples, the covering layer 1142 may also be provided with a hole 1148 to allow a user to access the valve 1144 to inflate and/or deflate the inflatable bladder 1140 once it is inside or partially covered by the covering layer 1142.

Figure 16:
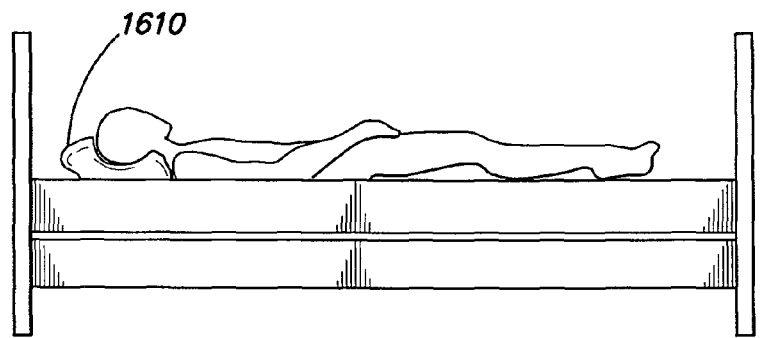
FIGS. 16-18 illustrate a configurable inflatable device configured as a pillow, which may serve as a neck or leg support at a first level of inflation and as a lumbar support at a second level of inflation.
Figure 17:
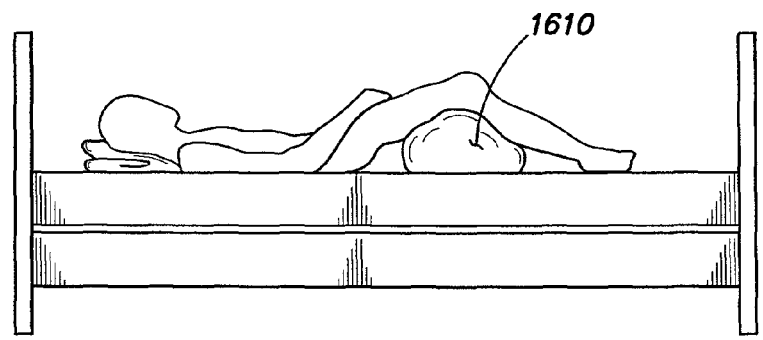

Another aspect of the invention is directed to the ability of an inflatable device to perform different functions based upon differing levels of inflation. Such an inflatable device may provide different positions to a portion of a body, or may make the device useful with differing portions of the body. For example, the inflatable device may be any suitable device as describe above with reference to FIG. 10A-15. For example, as illustrated in FIGS. 16-17, an inflatable device 1610 configured as a pillow may serve as a neck support at a first level of inflation and a first configuration of a configuring member (e.g., covering layer 1082, outer membrane 1132, fasteners 1136). A pillow for use as a lumbar support is typically smaller than a pillow for use a neck support. Accordingly, a pillow at a level of inflation for use as a neck support may be partially deflated by releasing fluid to bring it to a level of inflation suitable for use as a lumbar support. Similarly, a pillow at a level of inflation for use as a lumbar support may be further inflated by adding fluid to bring it to a level of inflation suitable for use as a neck support.

Figure 18:
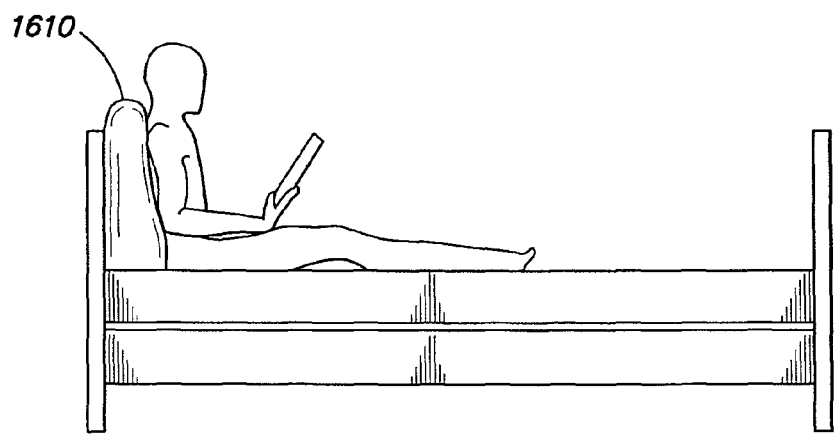
Figure 19:
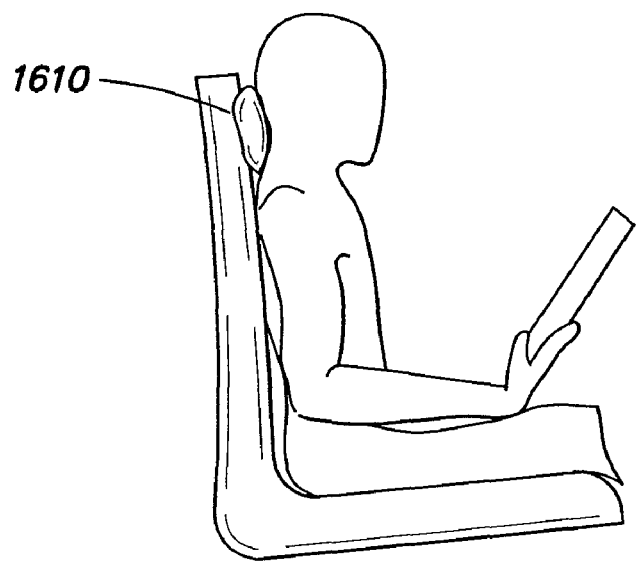
FIGS. 19-20 illustrate yet a further embodiment of an inflatable device able to perform different functions at different levels of inflation.
Figure 20:
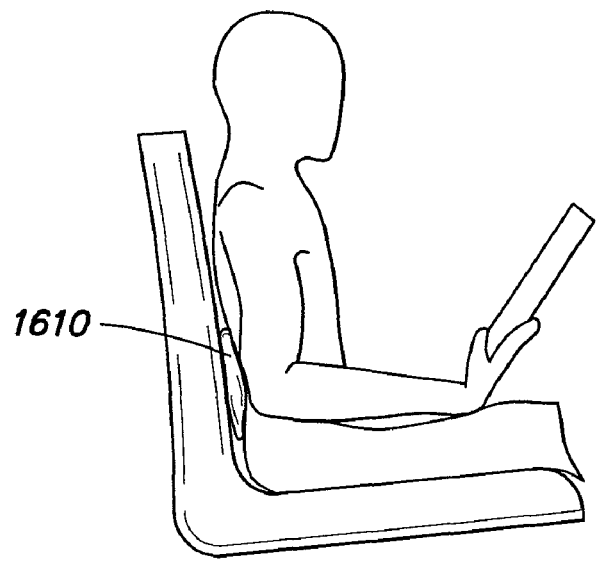

Another example of an inflatable device able to perform different functions based upon differing levels of inflation is illustrated in FIGS. 19-20. In this exemplary embodiment, inflatable device 1610 is configured as a pillow that may serve as a backrest at a first level of inflation (FIG. 20), a leg support at a second level of inflation (FIG. 19), and a head and/or neck support at a third level of inflation (FIG. 18). For example, the pillow may be used as a backrest in a fully inflated condition, a leg support in a partially deflated condition, and a head support in a further deflated condition. In some cases, to achieve a desired configuration, a level of inflation may be attained by folding or otherwise altering the shape of the inflatable device. As with other embodiments of the present invention, the level of inflation may be adjusted by adding or releasing fluid from an inflatable bladder comprising the inflatable device. This and the exemplary embodiment of FIGS. 16-18 are only two examples of the many different ways in which adjusting the level of fluid in an inflatable device according to the present invention may allow the device to perform multiple functions.

Having thus described several aspects of at least one embodiment of this invention, it is to be appreciated various alterations, modifications, and improvements will readily occur to those skilled in the art. For example, it is to be appreciated that for any of the above described embodiments, the fluid moving device can be provided remotely from, for example, the self-sealing valves, and also that the controls to bias on and off the fluid moving device and any of the electromechanical devices can be located remotely from the fluid moving device and the electromechanical devices. In addition, it is to be appreciated that there may be some embodiments or applications where the electromechanical device may also be used to open the self-sealing valve of any of the embodiments described infra for the purpose of aiding the inflating of the inflatable device such as, for example, where the self-sealing valve is not opened appreciably by the fluid moving device upon inflation. Such alterations, modifications, and improvements are intended to be part of this disclosure, and are intended to be within the spirit and scope of the invention. Accordingly, the foregoing description and drawings are by way of example only.

What is claimed is:

1. An inflatable mattress comprising:
   a plurality of inflatable bladders;
   a compartment located within a profile of the inflatable mattress, the compartment housing a plurality of valves each including a diaphragm and each valve fluidly coupled to an associated one of the plurality of inflatable bladders, respectively, wherein each of the plurality of valves is configured to control a flow of fluid into and out of a respective bladder with which it is associated;
   an electrically operated valve actuator located in the compartment and configured to open each of the plurality of valves, respectively; and
   a fluid moving device fluidly coupled to each of the plurality of inflatable bladders via an associated one of the plurality of valves and configured to provide fluid to each of the plurality of inflatable bladders.

2. The inflatable mattress of claim 1, further comprising a hose configured to fluidly couple the fluid moving device to the compartment, wherein the fluid moving device is remotely located from the compartment.

3. The inflatable mattress of claim 2, wherein the fluid moving device is enclosed in sound insulating material.

4. The inflatable mattress of claim 2, wherein the fluid moving device is located beneath the inflatable mattress.

5. The inflatable mattress of claim 1, further comprising a plurality of valve covers each associated with one of the plurality of valves, respectively.

6. The inflatable mattress of claim 5, wherein the electrically operated valve actuator is configured to open each of the plurality of valve covers.

7. The inflatable mattress of claim 6, wherein the fluid moving device is configured to pressurize the compartment with fluid, and wherein each of the plurality of valves is configured to open with the compartment pressurized when a valve cover associated with the valve is opened.

8. The inflatable mattress of claim 1, further comprising a control panel coupled to at least one of the electrically operated valve actuator and the fluid moving device, the control panel configured to allow a user to control inflation and deflation of the plurality of inflatable bladders.

9. The inflatable mattress of claim 7, wherein the inflatable mattress is configured to be used with a bed frame that includes the control panel.

10. The inflatable mattress of claim 1, wherein the compartment includes a barrier configured to fluidly isolate an interior of the compartment from ambient.

11. The inflatable mattress of claim 10, wherein the barrier is configured to couple to the fluid moving device.

12. The inflatable mattress of claim 1, wherein the compartment is formed by a barrier in combination with a bladder wall of at least one of the plurality of inflatable bladders.

13. The inflatable mattress of claim 1, wherein the electrically operated valve actuator is configured to displace each diaphragm to open each of the plurality of valves.

14. The inflatable mattress of claim 1, wherein at least a portion of the electrically-operated valve actuator moves in an arcuate-shaped path.

15. The inflatable mattress of claim 1, wherein the electrically operated valve actuator includes at least one of a solenoid and a motor.

16. The inflatable mattress of claim 1, wherein the electrically operated valve actuator is configured to open each of the plurality of valves to allow independent control of the fluid pressure in the plurality of inflatable bladders, respectively.

17. The inflatable mattress of claim 1, wherein each of the plurality of valves includes an actuator arm, respectively, configured to bias open an associated one of the plurality of valves.

18. The inflatable mattress of claim 1, wherein the fluid moving device is configured to pressurize the compartment with fluid, and wherein each of the plurality of valves remains closed with the compartment pressurized until opened by the electrically operated valve actuator.

19. The inflatable mattress of claim 18, wherein, when open, each of the plurality of valves is configured to release fluid from the associated one of the plurality of inflatable bladders, respectively, provided that the fluid moving device is not providing a positive pressure to the compartment.

20. The inflatable mattress of claim 1, wherein the electrically operated valve actuator is adapted to selectively open the plurality of valves in coordination with the pump.

21. The inflatable mattress of claim 1, wherein each of the plurality of valves is a self sealing valve.

22. The inflatable mattress of claim 1, wherein the plurality of inflatable bladders include a first bladder and a second bladder, wherein the first bladder is filled with fluid when the electrically operated valve actuator is in a first actuated position with pressurized fluid provided to the compartment, and wherein the second bladder is filled with fluid when the electrically operated valve actuator is in a second actuated position with pressurized fluid provided to the compartment.

23. The inflatable mattress of claim 1, wherein each of the plurality of valves is supported by the associated one of the plurality of inflatable bladders, respectively.

\* \* \* \* \*